United States Patent [19]
Ohta

[11] Patent Number: 5,111,514
[45] Date of Patent: May 5, 1992

[54] APPARATUS FOR CONVERTING HANDWRITTEN CHARACTERS ONTO FINELY SHAPED CHARACTERS OF COMMON SIZE AND PITCH, ALIGNED IN AN INFERRED DIRECTION

[75] Inventor: Junichi Ohta, Yokohama, Japan

[73] Assignee: Ricoh Company, Ltd., Japan

[21] Appl. No.: 593,818

[22] Filed: Oct. 5, 1990

[30] Foreign Application Priority Data

Oct. 5, 1989 [JP] Japan .................................. 1-258899

[51] Int. Cl.$^5$ ................................................ G06K 9/34
[52] U.S. Cl. .......................................... 382/9; 382/46; 382/44
[58] Field of Search ................... 382/9, 21, 10, 18, 11, 382/16, 44, 25, 46, 36, 63; 340/727; 358/496, 488, 448, 453

[56] References Cited

U.S. PATENT DOCUMENTS

| | | | |
|---|---|---|---|
| 4,513,442 | 4/1985 | Scherl | 382/9 |
| 4,527,283 | 7/1985 | Ito et al. | 382/9 |
| 4,635,212 | 1/1987 | Hatazawa | 382/44 |
| 4,741,046 | 4/1988 | Matsunawa et al. | 382/9 |
| 4,788,599 | 11/1988 | Sugishima | 382/44 |
| 4,802,229 | 1/1989 | Yamada | 382/46 |
| 4,903,313 | 2/1990 | Tachikawa | 382/9 |
| 4,907,283 | 3/1990 | Tanaka et al. | 382/9 |
| 4,926,490 | 5/1990 | Mano | 382/9 |
| 4,953,230 | 8/1990 | Kurose | 382/46 |
| 4,998,285 | 3/1991 | Suzuki et al. | 382/9 |

FOREIGN PATENT DOCUMENTS

| | | |
|---|---|---|
| 54-118720 | 9/1979 | Japan . |
| 58-85670 | 5/1983 | Japan . |
| 61-255483 | 11/1986 | Japan . |
| 62-281082 | 12/1987 | Japan . |
| 62-290984 | 12/1987 | Japan . |
| 64-53281 | 3/1989 | Japan . |

Primary Examiner—Michael Razavi
Attorney, Agent, or Firm—Mason, Fenwick & Lawrence

[57] ABSTRACT

A digital image forming apparatus which includes an image reading part for optically reading an original and photoelectrically converting an input image signal into a two-level image data carrying character images and graphic images, a first storage part for storing the two-level image data, a second storage part for storing an output image data to be outputted, a character cutting part for taking out individually the character images from the two-level image data to define a size of each of the character images and an array of black pixels within the character images, a character line extraction part for extracting a character line data from the second data based on the size of each of the character images and the array of black pixels within the character images, a character alignment part for correcting the character images to have the same size and the same distance therebetween and aligning the set of lines of characters along the character alignment direction so that the corrected character images and the aligned lines are defined in the output image data, and an output part for outputting a copy in which the output image data is reproduced.

10 Claims, 34 Drawing Sheets

FIG.2

| ITEM | SPEC | REMARK |
|---|---|---|
| SCANNER | | |
| SIZE | | |

FIG.3

| ITEM | SPEC | REMARK |
|---|---|---|
| SCANNER | | |
| SIZE | | |

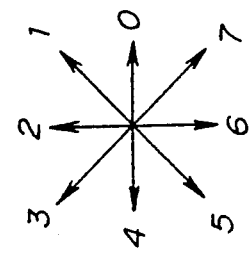
FIG.5
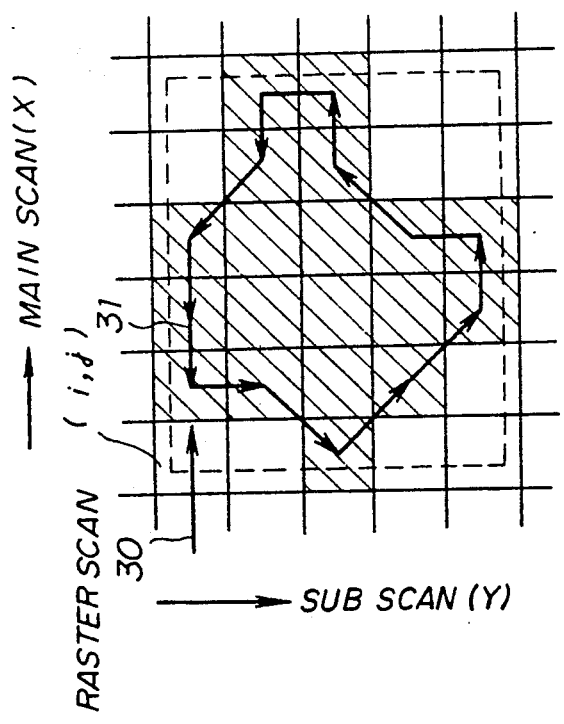
FIG.4
FIG.6
| Px | Py | Lx | Ly |
|----|----|----|----|
| i | j | 5 | 4 |
| . | . | . | . |
| . | . | . | . |
| . | . | . | . |

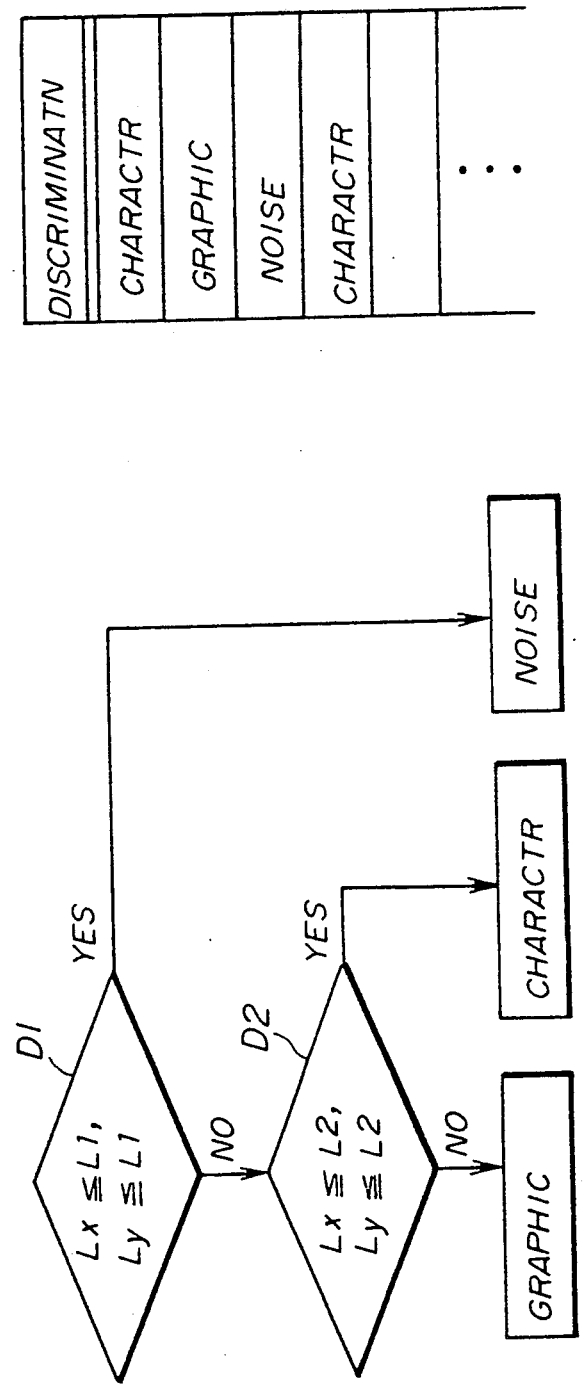

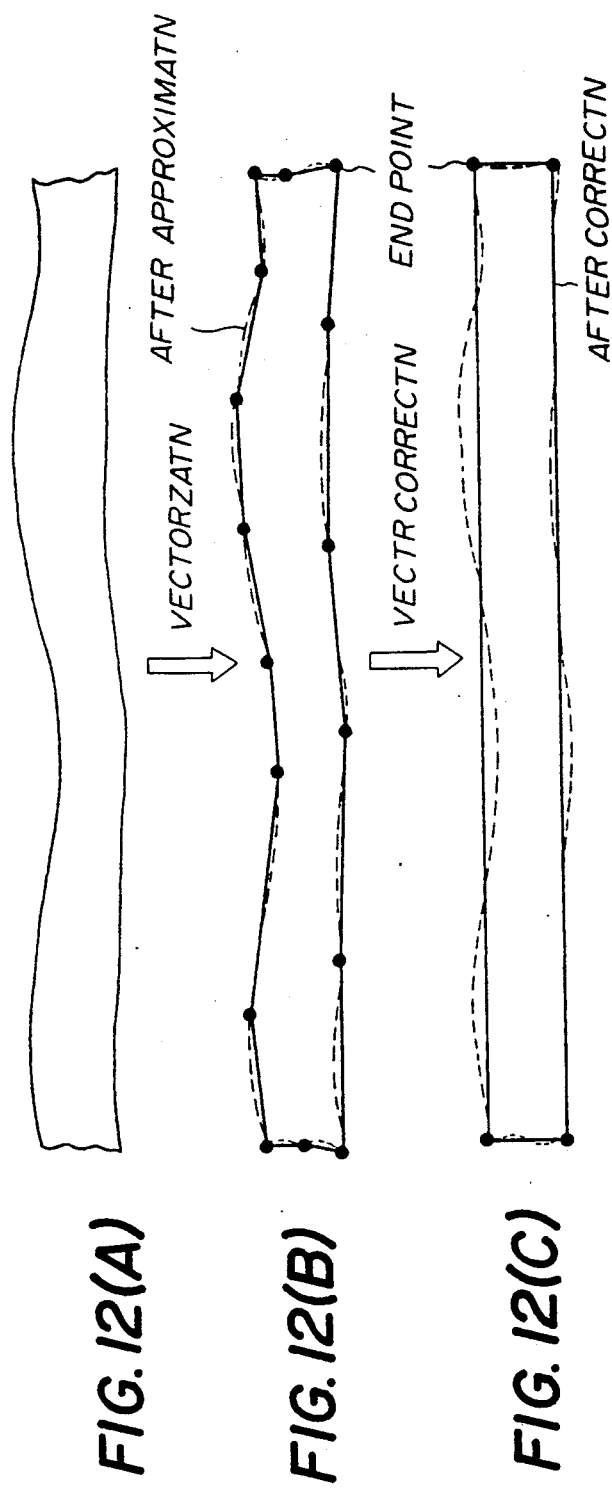

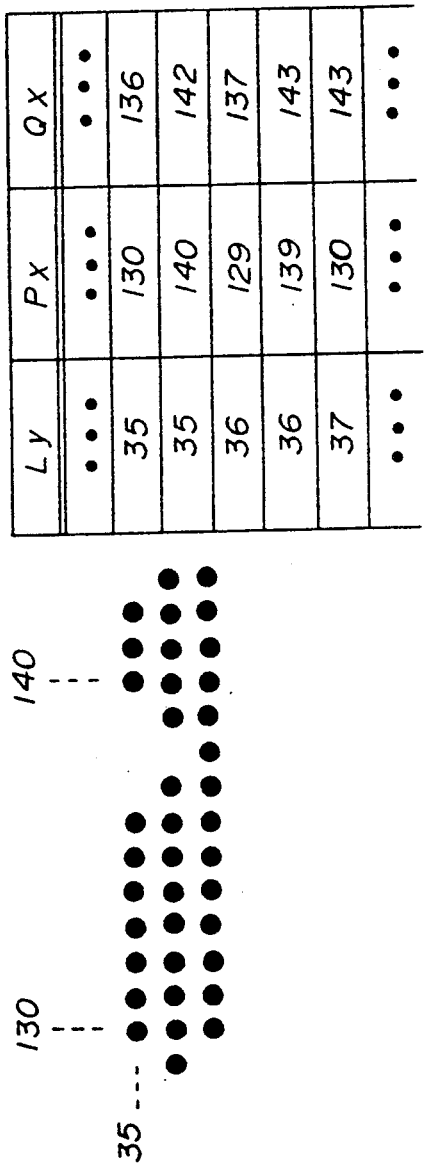

FIG.17

| SCANNER SPECIFICATN | | |
|---|---|---|
| ITEM | SPEC | REMARK |
| 1. METHOD | xxxx | xxxxxxxxxx |
| | xxxx | |
| 2. SIZE | | xxxxx |
| MAX | xxxx | |
| MIN | xxxx | |
| 3. SCALE FACTR | | xxxxxxx |
| MAX | xxxx | |
| MIN | xxxx | |

FIG.18

| SCANNER SPECIFICATN | | |
|---|---|---|
| ITEM | SPEC | REMARK |
| 1. METHOD | | |
| | xxxx | xxxxxxxxxx |
| | xxxx | |
| 2. SIZE | | xxxxx |
| MAX | xxxx | |
| MIN | xxxx | |
| 3. SCALE FACTR | | xxxxxxx |
| | xxxx | |
| | xxxx | |

FIG. 19
| SCANNER SPECIFICATN | | |
|---|---|---|
| ITEM | SPEC. | REMARK |
| 1. METHOD | xxxx<br>xxxx | xxxxxxxxxx<br><br>xxxx |
| 2. SIZE<br>  MAX<br>  MIN | xxxx<br>xxxx | |
| 3. SCALE FACTR<br>  MAX<br>  MIN | xxxx  xxxx<br>xxxx  xxxx | xxxxxxxx |
DESIGNATED REGION
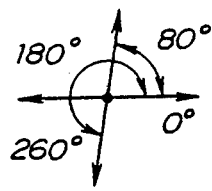 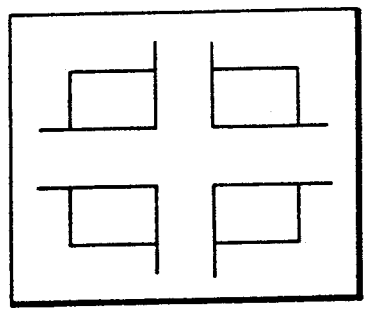 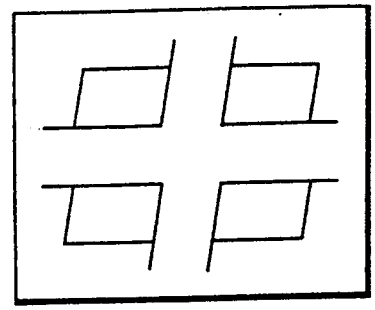
FIG. 20(A)　　FIG. 20(B)　　FIG. 20(C)

FIG.21

| SCANNER SPECIFICATN | | |
|---|---|---|
| ITEM | SPEC | REMARK |
| 1. METHOD | xxxx | xxxxxxxxxx |
|  | xxxx | xxxxx |
| 2. SIZE | | |
| MAX | xxxx | |
| MIN | xxxx | xxxxxxxx |
| 3. SCALE FACTR | | |
| MAX | xxxx | |
| MIN | xxxx | |

FIG.22

| SCANNER SPECIFICATN | | |
|---|---|---|
| ITEM | SPEC | REMARK |
| 1. METHOD |  |  |
|  | xxxx | xxxxxxxxxx |
|  | xxxx | xxxxx |
| 2. SIZE | | |
| MAX | xxxx | |
| MIN | xxxx | xxxxxxxx |
| 3. SCALE FACTR | | |
| MAX | xxxx | |
| MIN | xxxx | |

FIG.23

| SCANNER SPECIFICATN | | |
|---|---|---|
| ITEM | SPEC | REMARK |
| 1. METHOD | xxxx<br>xxxx | xxxxxxxxxx |
| 2. SIZE<br>  MAX<br>  MIN | <br>xxxx<br>xxxx | xxxxx |
| 3. SCALE FACTR<br>  MAX<br>  MIN | <br>xxxx<br>xxxx | xxxxxxx |

FIG.24

| SCANNER SPECIFICATN | | |
|---|---|---|
| ITEM | SPEC | REMARK |
| 1. METHOD | xxxx<br>xxxx | xxxxxxxxxx |
| 2. SIZE<br>  MAX<br>  MIN | <br>xxxx<br>xxxx | xxxxx |
| 3. SCALE FACTR<br>  MAX<br>  MIN | <br>xxxx  xxxx<br>xxxx  xxxx | xxxxxxx |

DESIGNATED REGION

FIG.25

| NO. | CONTENT | REMARK |
|---|---|---|
| 1 | xxxxxxxxxxx | xxxxxxxxx |
| 2 | xxxxxxxx | xxxxxxxx |
| 3 | xxxxxxxx | xxxxxxxx |
| 4 | xxxxxxx | xxxxxxxx |
| 5 | xxxxxxxx | xxxxxxxx |
| 6 | xxxxxxxx | xxxxxxxx |

FIG.26

| NO. | CONTENT | REMARK |
|---|---|---|
| 1 | xxxxxxxxxxx | xxxxxxxxx |
| 2 | xxxxxxxx | xxxxxxxx |
| 3 | xxxxxxxx | xxxxxxxx |
| 4 | xxxxxxxx | xxxxxxxx |
| 5 | xxxxxxxx | xxxxxxxx |
| 6 | xxxxxxxx | xxxxxxxx |

| NO. | CONTENT | REMARK |
|---|---|---|
| 1 | XXXXXXXXXXXX | XXXXXXXXX |
| 2 | XXXXXXXX | XXXXXXXX |
| 3 | XXXXXXXX | XXXXXXX |
| 4 | XXXXXXXX | XXXXXXXX |
| 5 | XXXXXXXX | XXXXXXXX |
| 6 | XXXXXXXX | XXXXXXXX |

FIG. 28

NOTE

REFERENCE NUMERALS IN FIG. 4 ARE AS GIVEN AT RIGHT.
NO.1 TO NO.3 SHOWN ARE XXXXXXXX

| NO. | CONTENT |
|---|---|
| 1 | XXX |
| 2 | XXX |
| 3 | XXX |
| 4 | XXX |
| 5 | XXX |

DESIGNATED REGION

FIG.30

| ITEM | SPEC | REMARK |
|------|------|--------|
| SCANNER | | |
| SIZE | | |

FIG.31

| ITEM | SPEC | REMARK |
|------|------|--------|
| SCANNER | | |
| SIZE | | |

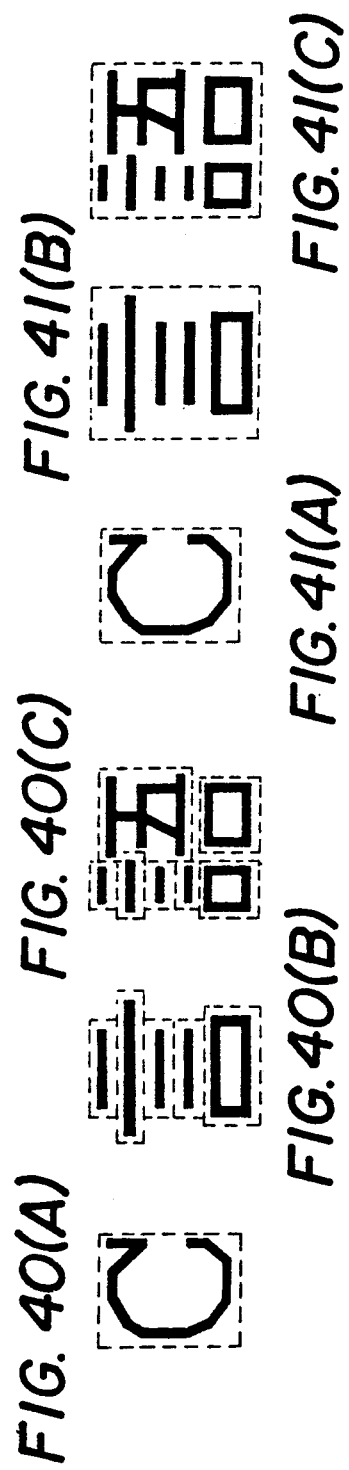

FIG. 51(A)

CHARA IMAGE — 1101, 1102, 1103, 1104, 1105, 1106, 1107, 1108, 1109, 1110

CUT REGION

CHARA LAYOUT ⇒

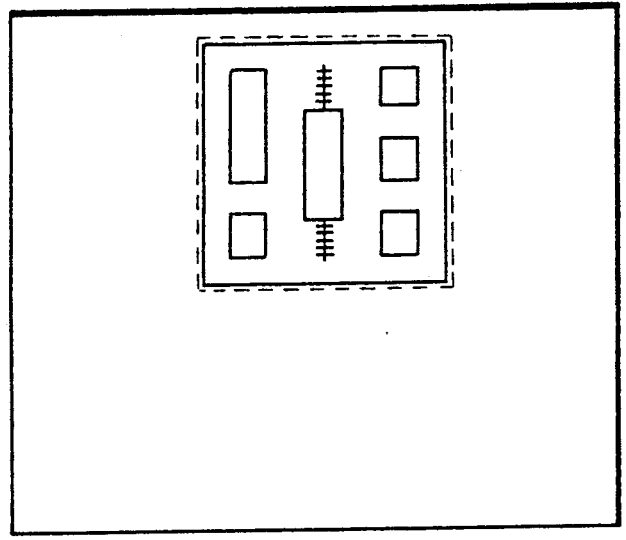
FIG. 52(B)
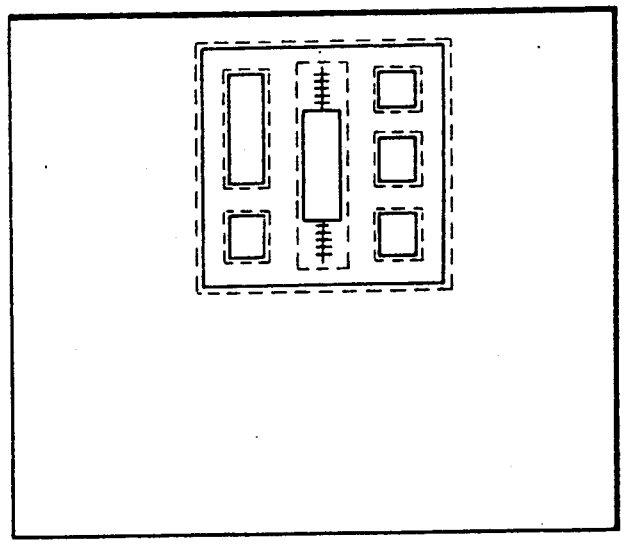
FIG. 52(A)

1ST OUTPUT

A B C D E F G H I J
K L M N O P Q R S T

2ND OUTPUT

COMPOSITE OUTPUT

A B C D E F G H I J
K L M N O P Q R S T

APPARATUS FOR CONVERTING HANDWRITTEN CHARACTERS ONTO FINELY SHAPED CHARACTERS OF COMMON SIZE AND PITCH, ALIGNED IN AN INFERRED DIRECTION

BACKGROUND OF THE INVENTION

The present invention generally relates to digital image forming apparatus, and more particularly to a digital image forming apparatus that performs a character information cutting, a character recognition or a graphic or picture recognition, which may be applied to digital copying machines, facsimile machines, wordprocessors and the like.

A conventional digital copying machine generally has no capability of performing an image recognition, and it is difficult to easily remake characters and linear graphics which are manually written in an original to a desired form or style in which the characters and the linear graphics are neatly arranged. This capability of digital image forming apparatus allows a wavy line drawn by hand on an original to be automatically modified to a completely straight line or allows a skewed circle manually written thereon to be automatically changed to a perfect circle. Conventionally, an original image remaking method has been used to carry out these tasks using existing apparatus such as a keyboard of a wordprocessor or an optical Chinese character recognition unit (so-called kanji OCR) for inputting information to remake an image of the original to a desired form or style. However, it is difficult to produce a finely modified image of the original with such existing apparatus, and using the above described conventional method is quite time-consuming. The remaking method using the wordprocessor keyboard especially requires much time and labor for inputting information to modify the image of the original. And, because the existing optical Chinese character recognition unit can achieve only a small certainty factor of the optical character recognition, the resultant image by using the Chinese character recognition unit is often troublesome in an image correction procedure and is not enough to produce a finely remade image of the original.

SUMMARY OF THE INVENTION

Accordingly, it is a general object of the present invention to provide a novel and useful digital image forming apparatus in which the above described problems are eliminated.

Another and more specific object of the present invention is to provide a digital image forming apparatus which comprises an image reading part for optically reading an original carrying character information and graphic information to generate an input image signal and photoelectrically converting the input image signal into a two-level image information carrying character images and graphic images, a first storage part for storing the two-level image information from the image reading part, a second storage part for storing an output image information, a character cutting part for taking out individually the character images from the two-level image information to define a size of each of the character images and an array of black pixels within the character images, a character line extraction part for extracting a character line information from the second information based on the size of each of the character images and the array of black pixels within the character images, the character line information defining a set of lines of characters in the output image information and a character alignment direction, a character alignment part for correcting the character images to have the same size and the same distance therebetween and aligning the set of lines of characters along the character alignment direction in accordance with the character line information so that an output character image information defined in the output image information is supplied to the second storage part, and an output part for outputting a copy in which the output image information stored in the second storage part is reproduced. According to the present invention, it is possible to convert an image of an original into a finely modified image in which characters written by hand are aligned in an inferred primary direction (horizontal or vertical) and arranged in the same character size and pitch. And, the digital image forming apparatus can automatically modify a manually made original to one with a good appearance.

Other objects and further features of the present invention will become apparent from the following detailed description when read in conjunction with the accompanying drawings.

BRIEF DESCRIPTION OF THE DRAWINGS

FIG. 2 is a diagram showing an original which has both character information and graphic information;

FIG. 3 is a diagram for explaining the image forming processing of the original shown in FIG. 2;

FIG. 4 is a diagram for explaining the method of outline following of a group of black pixels;

FIG. 5 is a diagram for explaining several directions that are used in the outline following;

FIG. 6 is a diagram showing resultant data that is used in the outline following;

FIG. 7 is a flow chart for explaining the character/graphic discrimination;

FIG. 8 is a diagram showing resultant data that is used in the character/graphic discrimination;

FIG. 12A-C is a diagram for explaining the method of vectorization;

FIGS. 14A and 14B are diagrams showing a structure of black pixel data;

FIG. 17 is a diagram showing an original written by hand having character information and graphic information;

FIG. 18 is a diagram for explaining the image forming processing of the original shown in FIG. 17;

FIG. 19 is a diagram for explaining the partial image processing;

FIGS. 20A, 20B and 20C are diagrams for explaining the designation of line alignment direction;

FIG. 21 is a diagram showing an original written by hand having character information and graphic information;

FIGS. 22 and 23 are diagrams for explaining the image forming processing of the original shown in FIG. 21;

FIG. 24 is a diagram for explaining the partial image processing;

FIG. 25 is a diagram showing an original written by hand having character information and graphic information;

FIGS. 26 and 27 are diagrams for explaining the image forming processing of the original shown in FIG. 25;

FIG. 28 is a diagram for explaining the partial image processing;

FIG. 30 is a diagram showing an original written by hand having character information and graphic information;

FIG. 31 is a diagram showing a copy in which a digital image forming is carried out by the digital image forming apparatus;

FIGS. 40A through 40C are diagrams for explaining the method of character cutting;

FIGS. 41A through 41C are diagrams for explaining the method of character cutting;

FIGS. 51A and 51B are diagrams for explaining the method of character layout;

FIGS. 52A and 52B are diagrams for explaining the method of automatic region extraction.

DESCRIPTION OF THE PREFERRED EMBODIMENTS

Figure 1:
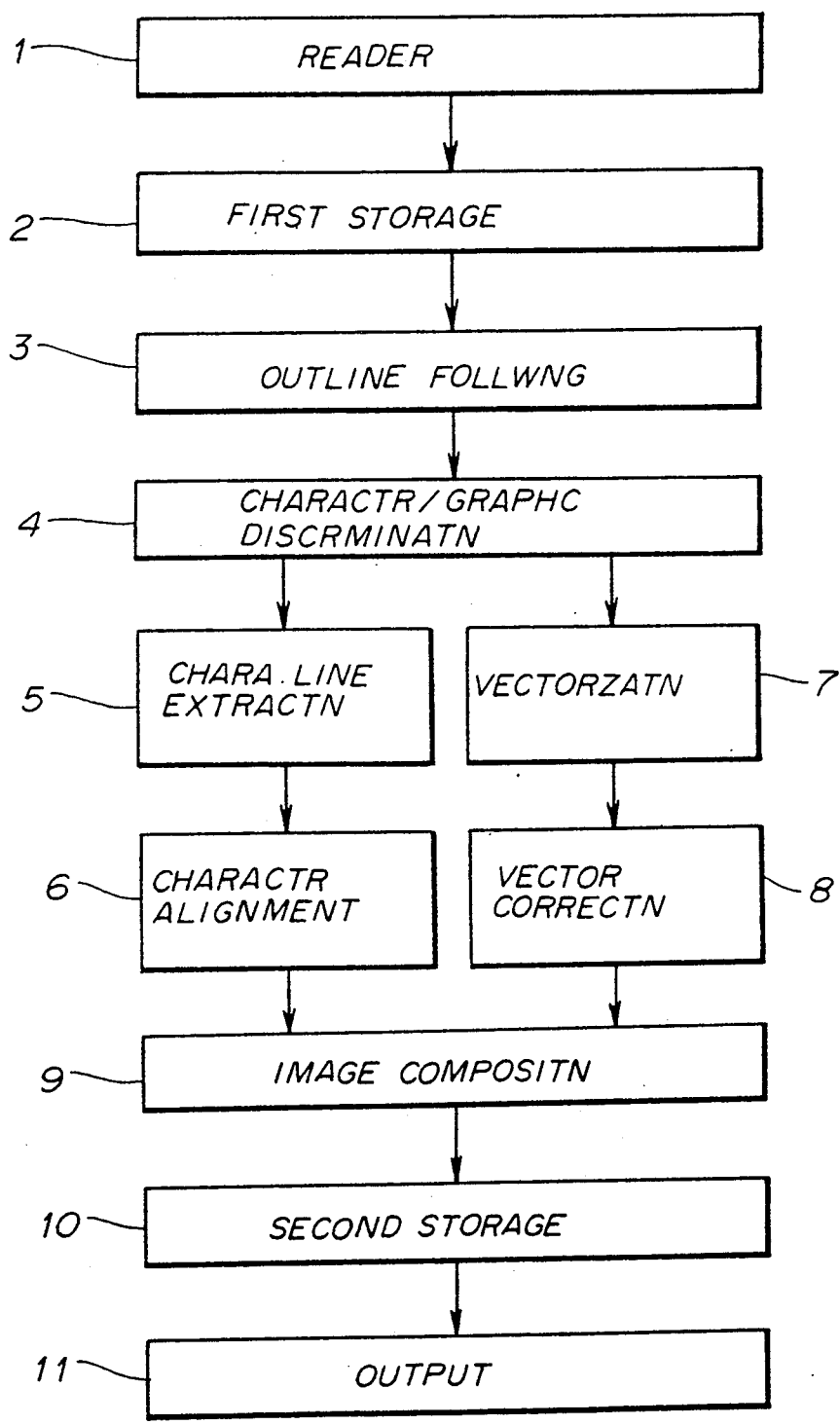
FIG. 1 is a block diagram showing a first embodiment of a digital image forming apparatus according to the present invention.

First, a description will be given of a first embodiment of a digital image forming apparatus according to the present invention, with reference to FIGS. 1 through 15. FIG. 1 shows a block diagram for explaining the control operation of the digital image forming apparatus which may be applied to a digital copier (not shown). As shown in FIG. 1, this image forming apparatus generally has a reader 1, a first storage part 2, an outline following part 3, a character/graphic discrimination part 4, a character line extraction part 5, a character alignment part 6, a vectorization part 7, a vector correction part 8, an image composition part 9, a second storage part 10, and an output part 11. FIG. 2 shows an original which contains manually written characters and linear graphics. With this original being placed on the digital copier, a start button in the digital copier is pressed. Then, the reader 1 optically reads the original to generate an optical signal and photoelectrically converts it into a binary image data or two-level image data. This two-level image data is stored in the first storage part 2 as an input image data. Next, the outline following part 3 follows an outline which is made up of a set of adjacent black pixels within the input image data stored in the first storage part 2 to determine the minimum coordinate values of the outline in a main scanning direction and in a sub scanning direction and the lengths thereof in both the directions. The smallest rectangle that surrounds the outline being formed by the black pixels is thus determined. Next, the character/graphic discrimination part 4 makes a decision as to whether the black pixels within the input image data constitute a character image or a graphic image, based on the size of the rectangle concerned. When the black pixels are a character image, the character line extraction part 5 infers a character line based on the array of the smallest rectangles thus determined, and calculates the average character width, the average character height, and the average character pitch by the rectangles within the input image data. Then, the character alignment part 6 calculates a scaling factor and a displacement with respect to each character image so as to make the width of the character images, the height thereof and the pitch between the character images equal. When the black pixels are a graphic image, the vectorization part 7 approximates the graphic image with vectors and lines. The vector correction part 8 corrects the approximated graphic image to minimize an angular difference between vector direction and a predetermined line alignment direction (e.g., horizontal or vertical). The image composition part 9 writes the corrected vector information from the vector correction part 8 on the second storage part 10, and produces the character image information based on the calculated scaling factor and displacement from the character alignment part 6 and writes such information also on the second storage part 10. Finally, the output part 11 reads out an output image information stored in the second storage part 10 and outputs a copy in which the output image information is reproduced.

FIG. 3 is a diagram showing a copy in which the digital image forming processing of the original shown in FIG. 2 is carried out as described above. In FIGS. 2 and 3, an outermost rectangle border line is added for making an understanding of the size and the location of the shown character images easier.

The above described first embodiment employs two separate storages which are the first storage part 2 and the second storage part 10, however, it is possible to use only a single storage device. This will allow the cost of the digital image forming apparatus to be reduced remarkably, because the current storage devices are usually expensive. In addition, only a partial image in a specifically designated portion of an original can be automatically processed, the designation of that portion being made by a suitable device such as a tablet or a marker. And, the digital copying machine to which the present invention is applied has several operation modes. In one operation mode, for example, the character/graphic discrimination part 4 discriminates between character images and graphic images, and the character alignment part 6 aligns the character images along an inferred direction but the graphic images remain unchanged, then the output part 11 outputs the results of such image forming processing. And, in another operation mode, for example, a copy in which only the aligned character images are formed with the graphic images being omitted can be outputted.

Referring next to FIGS. 4 through 15, the operation of the respective components of the digital image forming apparatus shown in FIG. 1 will be described.

(1) Outline Tracing

An outline following procedure is started by performing a raster scan of the input image data to search for a starting black pixel within the input image data. This following of an outline is made in a counterclockwise direction when the outline is an external outline located from the starting black pixel, and it is made in a clockwise direction when the outline is an internal outline located from the starting black pixel. This outline following procedure for one group of black pixels is repeated until a black pixel being searched returns to the starting black pixel. The foregoing steps are repeated until there is no group of black pixels constituting the outline.

FIGS. 4 and 5 are diagrams for explaining the method of the outline following. FIG. 4 shows an example of following an outline formed by a set of black pixels, and FIG. 5 shows several following directions ("0" through "7") in which an outline is followed. A direction "0" indicated in FIG. 5 is a main scanning direction X shown in FIG. 4, and a direction "6" in FIG. 5 is a sub scanning direction Y shown in FIG. 4. A raster scan is made in a direction indicated by an arrow 30 in FIG. 4. to search for a starting pixel with which the outline following is started. The starting pixel is found at a position (i+1, j), and a decision is made that this outline is an external outline, and the outline following is made from the starting pixel in the counterclockwise direction because a pixel being scanned prior to the starting pixel is found to be a white pixel. Next, a searching of black pixels adjacent to the starting pixel is repeatedly made in several directions which start from the direction "4" in FIG. 5 and change counterclockwise, and a next black pixel is first found by this searching at a position (i+1, j+1) by the starting pixel. A direction from the center of the starting pixel to the center of the next pixel is a direction of a part of this outline which in this case accords with the direction "6" in FIG. 5. The starting point of outline following is changed from the starting pixel to the second pixel (in this case, from the position (i+1, j) to the position (i+1, j+1)). These steps are repeated until the starting pixel (i+1, j) is reached. As the result, the outline following is completed with the final pixel being searched and the final direction being determined, as indicated by an arrow 31 in FIG. 4.

FIG. 6 is a diagram showing a list of outline data which is obtained from the above described outline following and stored on the first storage part 2. As shown in FIG. 6, each of the outline data comprises the minimum x and y coordinates Px and Py (starting point), and the outline's length Lx in x-direction (a main scanning direction) and the outline's length Ly in y-direction (a sub scanning direction perpendicular to the main scanning direction). The outline following shown in FIG. 4, for example, results in the outline data shown in the first line of the list shown in FIG. 6.

(2) Character/Graphic Discrimination

The character/graphic discrimination part 4 makes a decision as to whether an image inside the outline is a noise image, a character image or a graphic image based on the x-direction length Lx and the y-direction length Ly among the outline data (those shown in FIG. 6) obtained from the outline following. FIG. 7 shows a flow chart for explaining the method of the character/graphic discrimination. Threshold values of noise image length and character image length are predetermined to be L1 and L2, respectively. In the flow chart in FIG. 7, a decision D1 is made as to whether both Lx and Ly of the image inside the outline are smaller than L1. If both are smaller than L1, then that image is determined to be a noise image. If either Lx or Ly is greater than L1, then a decision D2 is made as to whether both Lx and Ly of the image inside the outline are smaller than L2. If they are both smaller than L2, then that image is determined to be a character image. In other cases than described above, that image is determined to be a graphic image.

FIG. 8 is a diagram for explaining the contents of the image discrimination data. The image discrimination data obtained from the character/graphic discrimination is encoded and stored on corresponding areas of the first storage part 2 as shown in FIG. 8. This image discrimination data is stored in sequence that is in accordance with that of the outline data shown in FIG. 6. To perform a right image discrimination when a reduction-/enlargement mode is used with the digital copying machine, it is necessary to change the noise image length threshold value L1 and the character image length threshold value L2 described above in accordance with the scale factor. For this reason, new changed threshold values L1' and L2' are calculated as follows:

$$L1' = L1 \times R$$

$$L2' = L2 \times R$$

where, R is a scale factor of reduction or enlargement when a reduction/enlargement mode of the digital copying machine is used. These threshold values L1' and L2' are used for the image discrimination instead of L1 and L2.

(3) Character Set Extraction

Figure 9:
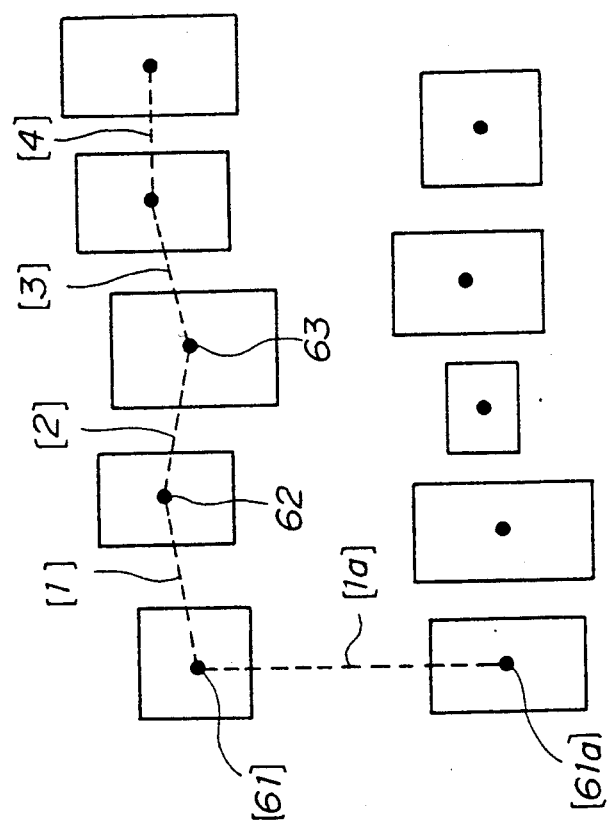
FIGS. 9 and 10 are diagrams for explaining the method of character line extraction.
Figure 10:
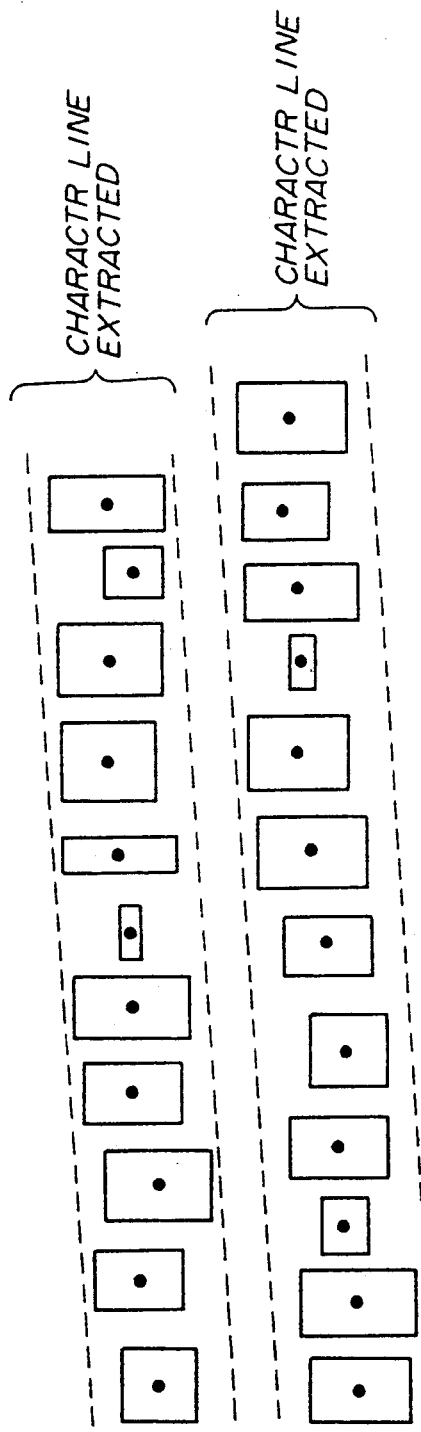

FIGS. 9 and 10 are diagrams for explaining the method of the character set extraction. FIG. 9 shows a typical method of character set inference. In FIG. 9, the center 40 of an outer boundary outline of a first character image is set to an origin, and distances between this origin 40 and the centers 41, 49 of another outer boundary outlines of character images adjacent to the origin are measured. And, the direction [1] having the smallest distance (between the centers 40 and 41) among those distances measured (including the distance between the centers 40 and 49) is assumed to be a direction of the character set, and the origin 40 is moved to the center 41 in the direction [1]. Similarly, distances between this new origin 41 and the centers of different outer boundary outlines of character images adjacent to the origin 41 are measured, and the direction [2] having the smallest distance among them is selected, and the origin 41 is moved to the center 42 in this direction [2]. This is repeated until the end of the set of characters is found. The center of the character image to be checked is determined to be the end of the set of characters when the distance between the centers is greater than a predetermined threshold value or when the direction with the smallest distance is changed to a different direction. As the result, the set of characters is extracted as illustrated in FIG. 10. In addition, the average height of characters in one character line, the average width thereof and the average distance between adjacent characters are determined by calculation, and from those values the vertical scale factor of character images, the horizontal scale factor thereof and the amount of displacement required are also calculated for a proper alignment of characters within the same character line. Excluded from the calculations of the average values are characters with a too small width (e.g., a numerical character "1"), characters with an excessibly small height (e.g., a hyphen "—") and characters with excessibly small height and width (e.g., small Hiragana or katakana letters).

(4) Character Alignment

Figure 11:
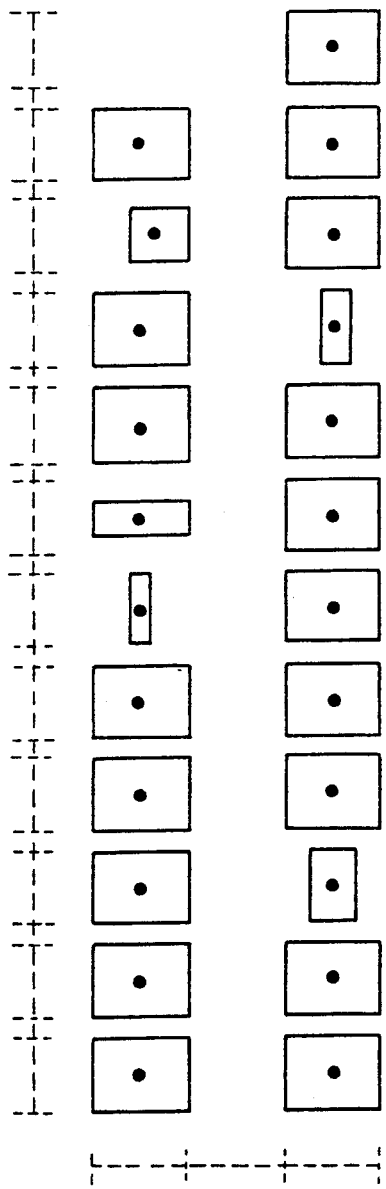
FIG. 11 is a diagram showing the result of the character line extraction.

FIG. 11 shows results of character alignment which is made for the set of characters extracted by the character set extraction part 5 as shown in FIG. 10. As shown in FIG. 11, character images are aligned horizontally and vertically by the character alignment part 6 in accordance with the vertical scale factor, the horizontal scale factor and the displacement obtained through the character set extraction part 5 as described above. It is possible to modify the size of character images and the distance between the character images to make the appearance of character images within an original (even hand-written ones) better.

(5) Vectorization

FIGS. 12A through 12C show diagrams for explaining the method of vectorization. A known technique of vectorization, or making vectors from a two-level linear picture data is disclosed, for example, in published article entitled "Picture Processing Using Multi-Dimensional Data Management Structure -Vectorization of Drawings-" by Yutaka Ohsawa et al., Vol.J68-D No.4, pages 845-852 issued April 1985 by Institute of Electronics and Communication Engineers of Japan, or in Japanese Published Patent Application No.62-286177. In such a prior art technique, an outer border line of two-level linear picture data and an inner border line thereof are followed to determine a centerline between the outer and inner lines, and this centerline is used as an approximated line vector. FIGS. 12A to 12C show an example of the vectorization technique. An input picture image shown in FIG. 12A is vectorized through this approximation method into a series of vectors linking one dot to another as shown in FIG. 12B.

(6) Vector Correction

A non-linear line formed by those vectors after approximation, as shown in FIG. 2B, can be corrected by unifying those vectors with a small difference in angle or those with a small difference in distance into a single vector, so that an irregularity of the non-linear line due to hand writing is eliminated and the thus unified straight lines are created as indicated in FIG. 2C.

(7) Error Processing in Character Alignment

Figure 13A:
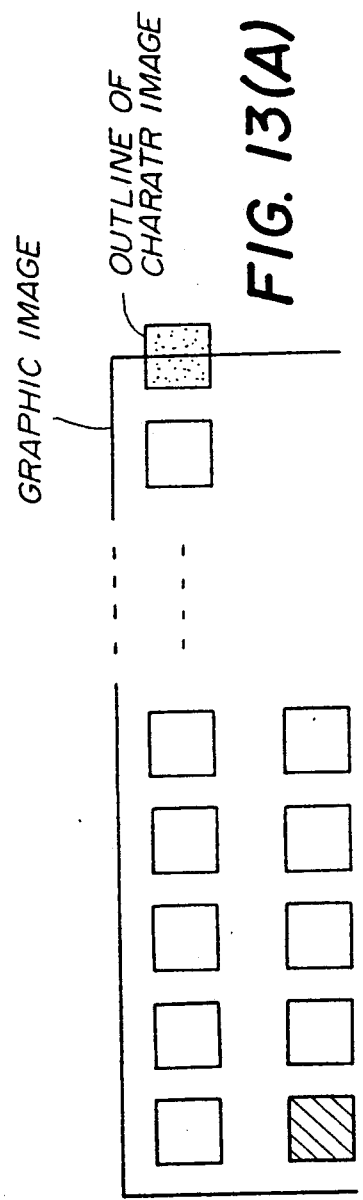
FIG. 13A-C is a diagram for explaining the procedure of correcting an error which may occur during the character alignment.
Figure 13B:
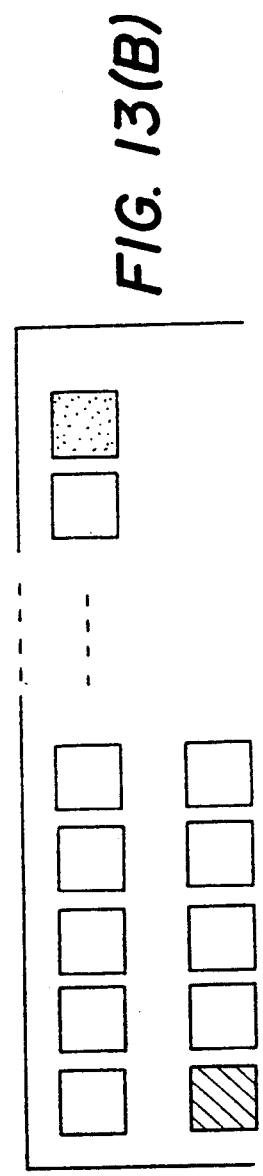
Figure 13C:
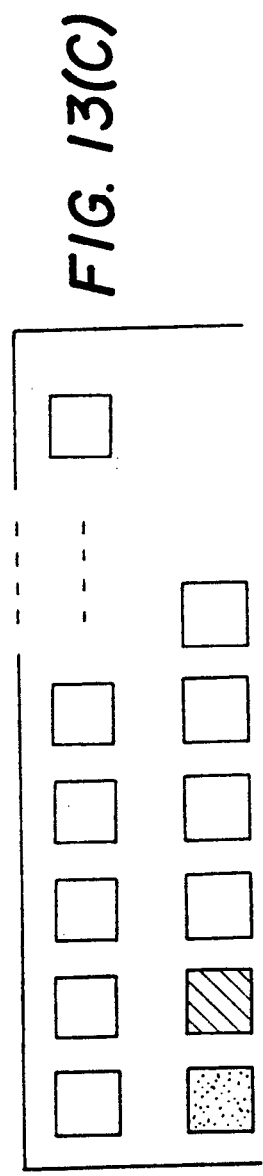

FIGS. 13A through 13C show diagrams for explaining the character alignment. When a character image after character alignment overlaps a graphic image as shown in FIG. 13A, there are two correction methods. One method is to re-arrange the character images by making the distances between adjacent characters, and the other method is to move the character overlapped to a place at top of a next character line and shift the next character line to right by one character. These correction methods are applicable also when a character image goes out of an effective region of a copy.

(8) Image Compression And Decompression

Since storage devices today are usually expensive, it is desirable to perform the function of the present invention with a smaller number of storage devices. One conceivable procedure of image compression and decompression is to perform reduction of an image from an original when being scanned and, after image forming of the reduced image data is completed, perform decompression (or restoration) of an output image data. This procedure can reduce the number of operations to carry out several processings from the input to the output, making a time required for the processings shorter, but performing this procedure may cause deterioration of the quality of character image formed on a copy. Another procedure of image compression and decompression is to compress an input image data after an original is scanned, and, after image forming is completed, decompress the processed image data for outputting a copy with the restored image. Although a conventional MH process of image compression and decompression which has been applied to a facsimile machine is usable for performing the latter procedure, the present invention requires image information of black pixels only, and a method of image compression and decompression using black pixel run data will be described in the following.

FIGS. 14A and 14B are diagrams for explaining the structure of black pixel run data. These black pixel run data are expressed by a position Ly of a run of black pixels in the sub scanning direction (in y direction), a starting position thereof Px in the main scanning direction (in x direction) and an end position thereof Qx in the main scanning direction (in x direction). And these data are stored sequentially in accordance with a raster scanning.

Figure 15:
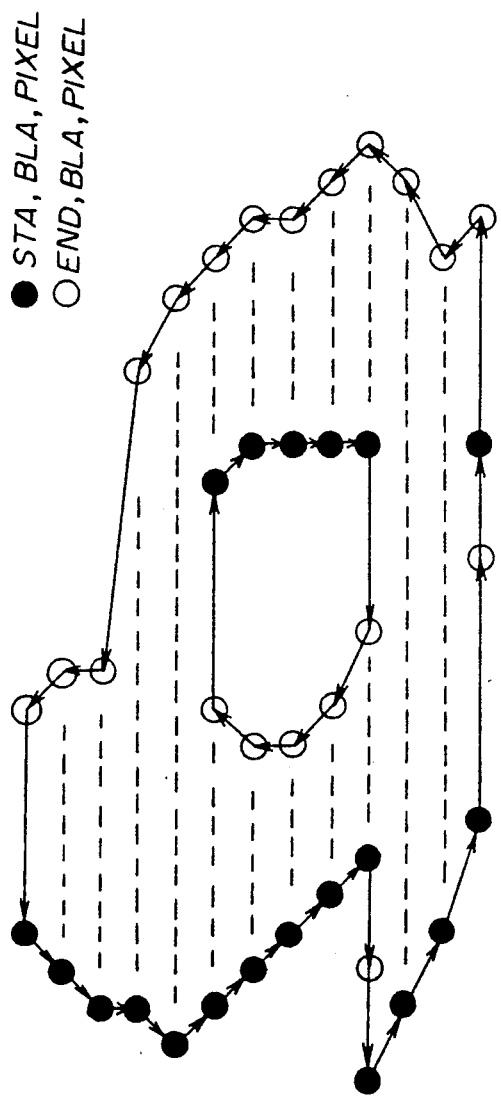
FIG. 15 is a diagram for explaining the method of outline following for a compressed image data.

FIG. 15 is a diagram for explaining the method of outline following for compressed image data. The above described outline following method may not be used, because the input image data is a compressed image data. The following procedure is used to carry out the outline following of compressed image data.

1) Check compressed image data sequentially in the sub scanning direction to find a starting black pixel in a first line which is newly followed.
2) Find another starting black pixel in a next line which is newly followed, starting from the starting black pixel in the first line to a positive sub scanning direction (in y direction along which the number of sub scanning lines increases).
3) When, in a step 2) above, an end black pixel in the preceding line is found nearer to a starting black pixel in the preceding line than a starting black pixel in the following line, change the point to be next checked to the end black pixel in the preceding line and find another end black pixel in a next line, starting from that end black pixel in the preceding line to the opposite sub scanning direction (in y direction along which the number of sub scanning lines decreases).
4) When no starting black pixel in a next line which is newly followed is found, change the point to be next checked to the end black pixel in the preceding line and find another end black pixel in a next line, starting from the end black pixel in the preceding line to the opposite sub scanning direction.
5) When, in steps 3) and 4) above, a starting black pixel in the following line is found nearer to a starting black pixel in the preceding line than an end black pixel in the following line, change the point to be next checked to the starting black pixel in the following line and find another starting black pixel in a next line, starting from that starting black pixel in the following line to the positive sub scanning direction.
6) Repeat steps 2) through 5) until the point to be next checked returns back to the first starting black pixel and an outline of black pixels is completed. And, perform repeatedly steps 1) through 6) above for a next outline following until there is no starting black pixel in a next line which is not yet followed.

Compared with the outline following method described previously, the present outline following method of compressed image data as indicated in FIG. 15 requires a shorter processing time, because only starting black pixels and end black pixels are checked in the present method. And, in the structure of black pixel run data shown in FIG. 14, provision of an identification flag of a black pixel run which is turned on for each outline following of black pixel outlines when a discrimination is completed will allow elimination of a memory used for an output image data and ensure accurate classification of adjacent black pixels.

The movement and multiplication of a character image is carried out after a black pixel run data for a character image is extracted, with the following formula. A starting position (xs1, ys1) of a black pixel run and a length (xl1) thereof after the movement and multiplication is represented by $$xs1 = (xs - xcs)xr + (xcs + xm)$$

$$ys1 = (ys - ycs)yr + (ycs + ym)$$

$$xl1 = xl \cdot xr$$

where (xs, ys) is a starting position of black pixel run before movement and multiplication, xl is an initial length thereof, (xcl, ycl) is a size of character image outline, (xcs, ycs) is a position of an upper left corner of the outline, (xm, ym) is quantity of displacement, and (xr, yr) is a scaling factor.

Figure 16:
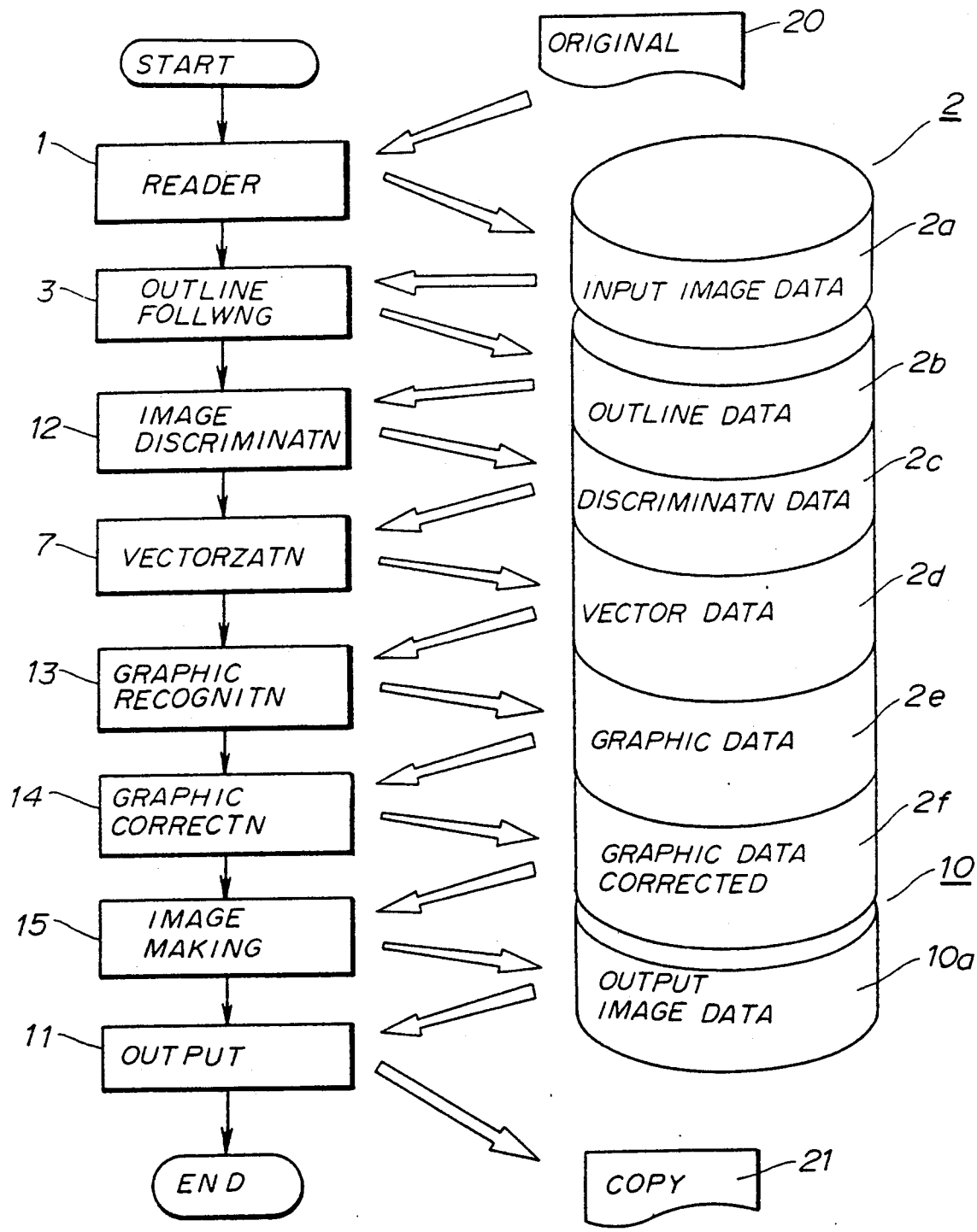
FIG. 16 is a diagram for explaining the control operation of the digital image forming apparatus.

FIG. 16 is a diagram for explaining the control operation of the digital image forming apparatus. FIG. 17 is a diagram showing an original written by hand which has character information and graphic information. An original 20 as shown in FIG. 17 is optically scanned by the reader 1, and an optical information from the original is converted into a two-level digital data. This two-level digital data is thus produced and it is is stored in the first storage part 2 as the input image data 2a shown in FIG. 16. The outline following part 3 reads out the input image data 2a from the first storage part 2 and follows an outline of groups of adjacent black pixels to determine the minimum x coordinate of the outline in the main scanning direction and the minimum y coordinate thereof in the sub scanning direction and the lengths of the outline in the main scanning direction and in the sub scanning direction, and stores an outline data 2b containing those coordinate data in the first storage part 2. After the outline following is completed for all the input image data 2a, the image discrimination part 12 reads out the outline data 2b from the first storage part 2 and performs discrimination of black pixels within the input image data 2a between the character, the graphic and the noise, based on the size of the outline concerned. The Image discrimination part 12 stores such discrimination results in the first storage part 2 as the discrimination data 2c. Next, the vectorization part 7 reads out the discrimination data 2c from the first storage part 2 so that graphic images are extracted, and performs vectorization of the graphic images and stores the vectorized results in the first storage part 2 as the vector data 2d. The graphic recognition part 13 reads out the vector data 2d from the first storage part 2, and recognizes graphic elements such as a straight line and a circle from the vector data 2d and recognizes the relative connections between the graphic elements, then stores the recognition results in the first storage part 2 as the graphic data 2e.

The graphic correction part 14 reads out the graphic data 2e from the first storage part 2, and corrects the graphic data 2e in accordance with a predetermined line alignment direction, which is selected by an operator at the start of copying, so that the straight line direction accords with the predetermined line alignment direction with the angular difference therefrom being minimized and the relative connections of the graphic elements being maintained. The graphic correction part 14 stores the corrected graphic data 2f in the first storage part 2. The image making part 15 stores the corrected graphic data 2f after correction as well as the character data obtained from the discrimination image data 10a. Finally, the output part 11 reads out the output image data 10a from the second storage part 10 and forms an image corresponding to the output image data on a copy 21, and this copy is ejected out of the digital image forming apparatus. In this manner, a composite image as shown in FIG. 18 is formed on the outputted copy.

FIG. 19 is a diagram for explaining the partial image processing. Before the above described function is carried out, a region within the original is designated, as shown in FIG. 19, allowing the partial image processing of this region to be performed. It is possible to carry out this partial image processing in a shorter time than that required for the overall image processing. FIG. 20 is a diagram for explaining the designation of line alignment direction for carrying out the image forming processing. As shown in FIG. 20A, a line alignment direction at an angle of 80 degrees to the horizontal line is designated freely prior to the image forming processing. This designation of the line alignment direction allows the processed image of an output copy shown in FIG. 20C to be produced from the image of an original shown in FIG. 20B. As shown in FIGS. 20B and 20C, vertical straight lines in the image of the original are each aligned in parallel to the designated line alignment direction so that the processed image of the output copy has the corresponding straight lines inclined at an angle of 80 degrees, for example.

FIG. 21 is a diagram showing an original written by hand which has character information and graphic information, and FIGS. 22 and 23 are diagrams for explaining the image forming processing of this original shown in FIG. 21. Similarly to the above described method, the graphic data 2e is read out from the first storage part 2 and it is corrected in accordance with a predetermined line alignment direction with the angular difference therefrom being minimized and the relative connections of the graphic elements being maintained. FIG. 22 shows an intermediate image reproduced from the thus corrected graphic data after the graphic data correction. When a first end point of a graphic element among the corrected graphic data is at a distance from a second end point of another graphic element and that distance between the first and second end points is smaller than a predetermined threshold value, the graphic data correction is made so that the line of the former graphic element is extended from the first end point to the second end point. The corrected graphic data after this graphic data correction is stored in the first storage part 2. The image making part 15 stores, in the second storage part 10 as the output image data 10a, the corrected graphic data 2f after such correction as well as the character information discriminated as characters by the image discrimination part 12. Finally, the output part 11 reads out the output image data 10a from the second storage part 10 and forms an image corresponding to the output image data on a copy 21, and this copy is ejected out of the digital image forming apparatus. In this manner, a composite image as shown in FIG. 23 is formed on the outputted copy. FIG. 24 is a diagram for explaining the partial image processing. Before the above described function is carried out, a region within the original is designated, as shown in FIG. 24, allowing the partial image processing of this region to be performed. It is possible to carry out this partial image processing in a shorter time than that required for the image processing of the overall area of the original. However, different kinds of lines from a solid line, such as a dotted line shown in FIG. 24, are converted into a solid line through this image forming processing.

FIG. 25 is a diagram showing an original written by hand having character information and graphic information. FIGS. 26 and 27 are diagrams for explaining the image forming processing of the original shown in FIG. 25. Similarly to the above described method, the graphic data 2e is read out from the first storage part 2 and it is corrected in accordance with a predetermined line alignment direction with the angular difference therefrom being minimized and the relative connections of the graphic elements being maintained. FIG. 26 shows an intermediate image reproduced from the thus corrected graphic data. When three or more straight lines, among the corrected graphic data, are parallel to one another but are at different distances from one another and a difference between the distances is smaller than a predetermined threshold value, these straight lines are corrected so that they are evenly spaced at the average distance of those distances. The corrected graphic data after this graphic data correction is stored in the first storage part 2. The image making part 15 stores, in the second storage part 10 as the output image data 10a, the corrected graphic data 2f after such correction as well as the character information discriminated as characters by the image discrimination part 12. Finally, the output part 11 reads out the output image data 10a from the second storage part 10 and forms an image corresponding to the output image data on a copy 21, and this copy is ejected out of the digital image forming apparatus. In this manner, a composite image as shown in FIG. 27 is formed on the outputted copy.

The correction of parallel lines into evenly spaced parallel lines described above will be be described in greater detail, with reference to FIGS. 26 and 27. Straight lines from the graphic data 2e are aligned as shown in FIG. 26, and there are horizontal straight lines L11 through L18 almost in parallel and at distances Y1 through Y7 that are nearly equal to one another, and vertical straight lines L21 through L23 almost in parallel and at distances X1 and X2 that are nearly equal to each other. In this case, the lines L11 through L18 are moved in parallel to make the distances Y1 through Y7 equal to the average distance of them so that these horizontal lines are evenly spaced. And, the lines L21 through L23 are moved in parallel to make the distances X1 and X2 equal to the average distance thereof so that these vertical lines are evenly spaced. FIG. 27 shows the corrected parallel lines after such correction. As shown in FIG. 27, the horizontal straight lines L12 through L18 are corrected to new lines L12' through L18' at the same distance from one another (new distances Y1' through Y7' all equal), and the vertical straight lines L22 and L23 are corrected to new lines L22' through L23' are also re-arranged at the same distance (new distances X1' and X2' equal to each other).

FIG. 28 is a diagram for explaining the partial image processing. Before the above described function is carried out, a region within the original is designated, as shown in FIG. 28, allowing the partial image processing of this region to be performed. It is possible to carry out this partial image processing in a shorter time than that required for the image processing of the overall area of the original.

Figure 29:
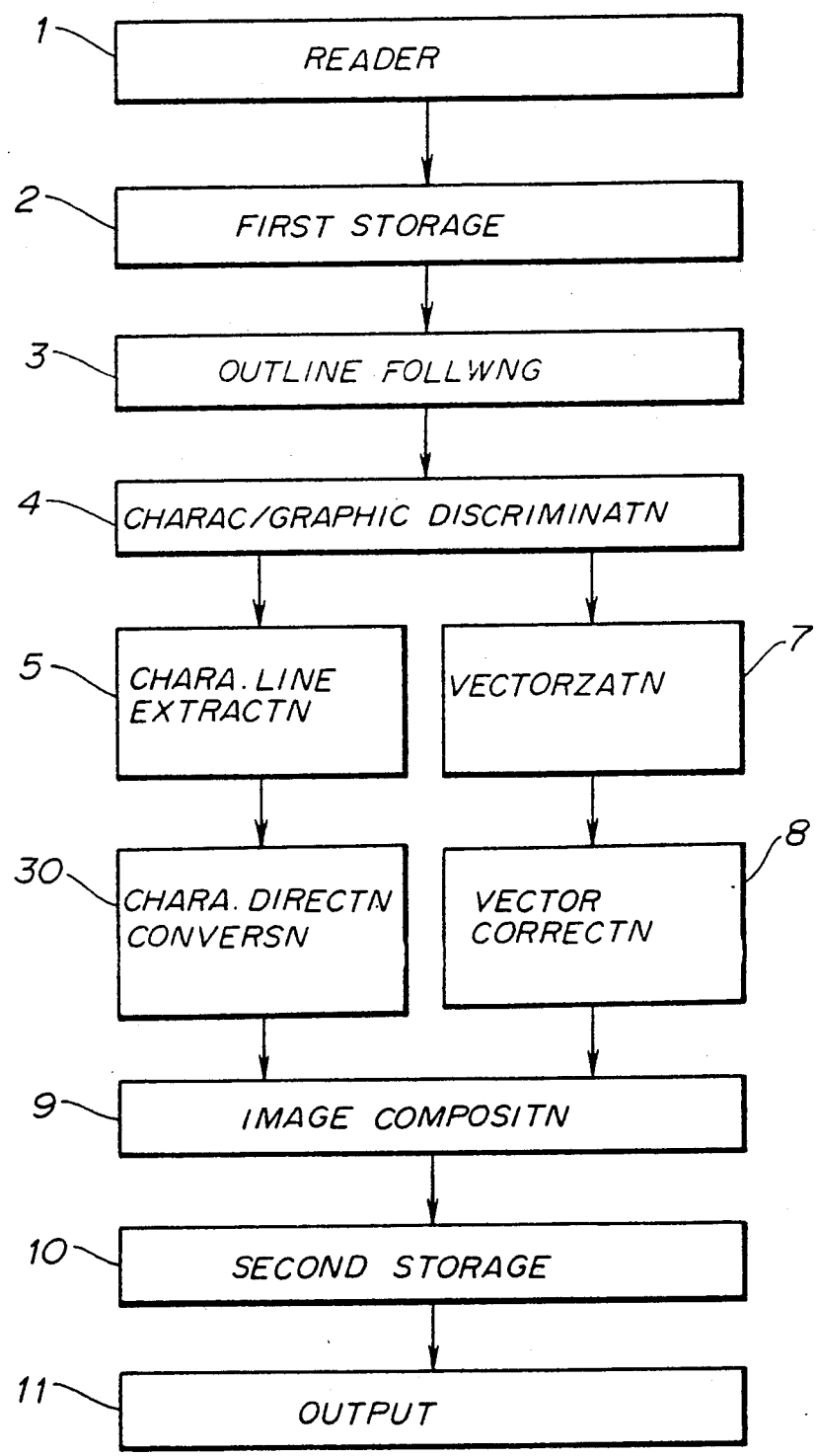
FIG. 29 is a block diagram showing a second embodiment of the digital image forming apparatus.

Next, a description will be given of a second embodiment of a digital image forming apparatus according to the present invention, with reference to FIGS. 29 through 35. In FIG. 29, the digital image forming apparatus is provided with a character direction conversion part 30. In this drawing, those corresponding parts which are the same as those parts in FIG. 1 are designated by the same reference numerals except for the character direction conversion part 30, and a description thereof will be omitted.

After the character line extraction part 5 infers a character line of the character images from distribution of the smallest rectangles, the character direction conversion part 30 calculates a rotation angle of each character image and a displacement thereof which are required for the character direction to be converted. When the character line of the character images has a horizontal direction as shown in FIG. 30, the character direction is converted to a vertical direction as shown in FIG. 31, and when it has a vertical direction it is converted to a horizontal direction. And, after the vectorization part 7 approximates the graphic information with linear graphic images and vectors, the vector correction part 8 performs vector correction so that a corrected direction of the vectors accords with a predetermined alignment direction (e.g., vertical or horizontal direction) and a smaller angular difference is produced between the corrected direction and the predetermined alignment direction. Then, the image composition part 9 stores the graphic data of the corrected vectors from the vector correction part 8 in the second storage part 10, and stores the character data including the rotation angle and displacement of each character image calculated by the character direction conversion part 30 in the second storage part 10. Finally, the output part 11 reads out an output image information from the second storage part 10 and forms an image corresponding to the output image information on a copy, and ejects this copy out of the digital image forming apparatus. In this manner, a composite image as shown in FIG. 31 is formed on the outputted copy.

Figure 32:
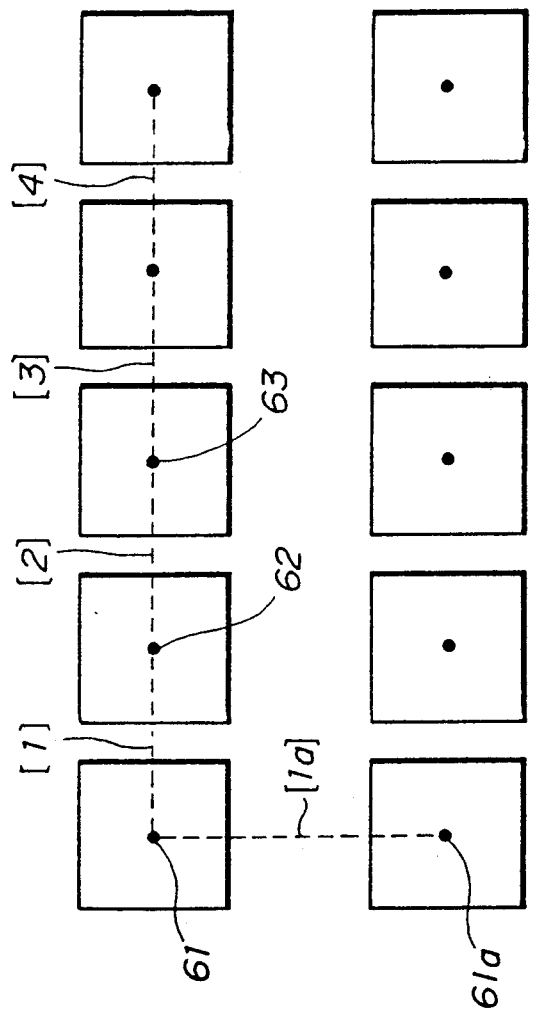
FIG. 32 is a diagram for explaining the method of character line extraction.
Figure 33:
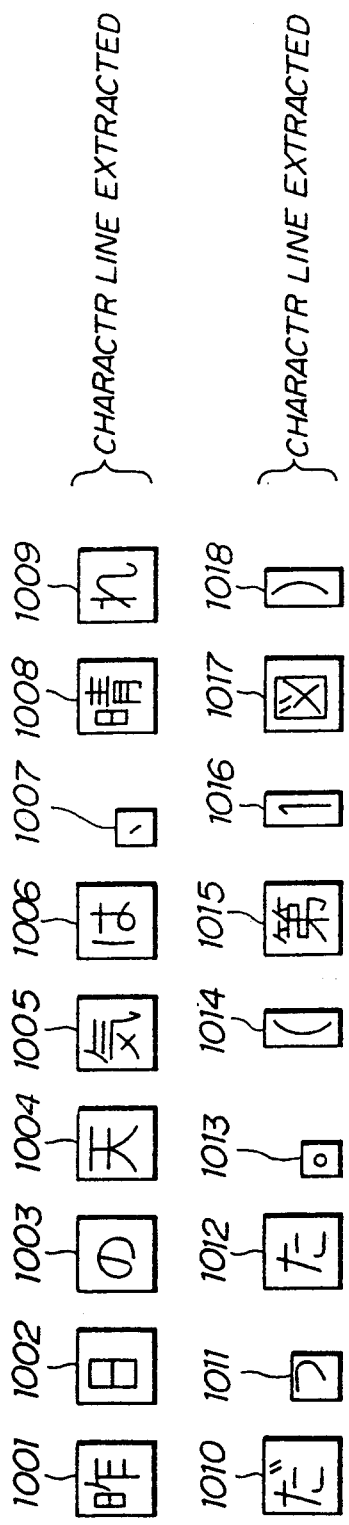
FIGS. 33 and 34 are diagrams for explaining the method of character line direction conversion.
Figure 34:
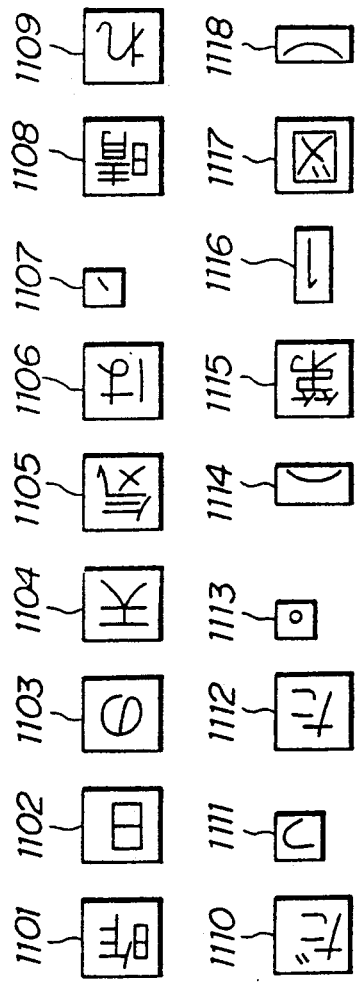

FIG. 32 is a diagram for explaining the method of character line extraction. This character line extraction method is the same as that described above with FIGS. 9 and 10, and a description thereof is omitted. FIGS. 33 and 34 are diagrams for explaining the method of character direction conversion. For example, a first line of characters 1001 to 1009 and a second line of characters 1010 to 1018 are extracted by the character line extraction part 5, as shown in FIG. 33. From the heights, the widths and the pitches of characters within one character line, the character line extraction part 5 calculates the average character height, the average character width and the average pitch, and determines a rotating direction of each character image and a displacement thereof that are necessary for the character direction conversion to be made. The character images in the lines of characters written sideways as shown in FIG. 33 are re-arranged based on the displacement and the rotating angle thus calculated to result in the character images in the lines of characters written vertically as shown in FIG. 34. In this manner, the character direction is converted by rotation and movement of character images within the original. In the case of small characters (e.g., small "kana" letters, or small Hiragana and katakana letters), the displacement after rotation is different from that of characters with a great size. For example, the character 1011 in FIG. 33, written sideways, which is aligned at a bottom level is converted to the character 1111 in FIG. 34, written vertically, which is aligned at a top level. Similarly, the character 1007 or character 1013 (punctuation marks) in FIG. 33 before the character direction conversion is aligned at a bottom level, while the character 1107 or character 1113 in FIG. 34 after the character direction conversion is aligned at a top level. In the case of parentheses (e.g., character 1014 in FIG. 33 and character 1114 in FIG. 34), the rotation is not made and the character direction remains unchanged when the character direction conversion is performed. Therefore, a suitable character recognition means is required for checking whether a thin character written sideways and a flat character written vertically is a parenthesis or not. It is possible for a digital image forming apparatus having a simplified structure to use a region designation procedure manually performed by an operator to indicate a character region which should not be rotated in the character direction conversion. In other words, the character direction conversion part 30 converts a first direction, to which a top of each of the character images is directed, into a second direction perpendicular to the first direction. This first direction is rotated by 90 degrees counterclockwise by the character direction conversion part 30 when the first direction is perpendicular to the main scanning direction, as shown in FIG. 33. And the first direction is rotated by 90 degrees clockwise when the first direction is parallel to the main scanning direction, as shown in FIG. 34.

Figure 35:
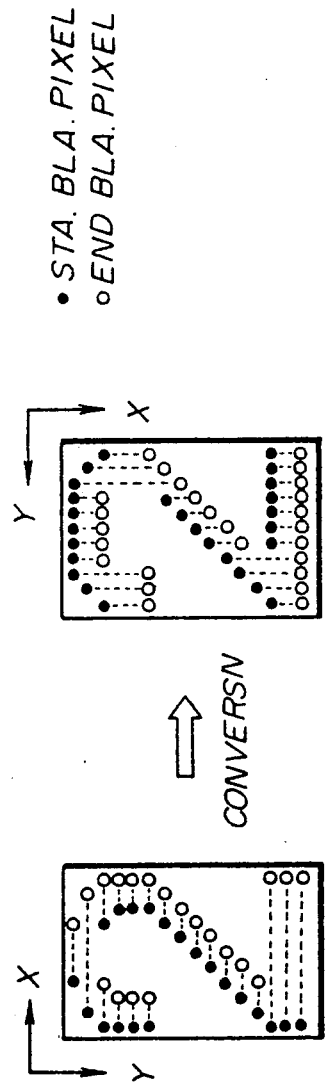
FIG. 35 is a diagram for explaining the procedure of character image rotation.

FIG. 35 is a diagram for explaining the method of character image rotation. As shown in FIG. 35, the character image rotation is performed by extracting the run length data for one character image in a main scanning direction, and coverting it into that in a sub scanning direction. The character image movement can be performed by adding the displacement to the y-direction position, x-direction starting position and x-direction end position of the run length data after the character image rotation. According to this method, it is possible to produce a non-column form of characters written sideways from a multi-column form of characters written vertically through the character line extraction and character line direction conversion described above.

Figure 36:
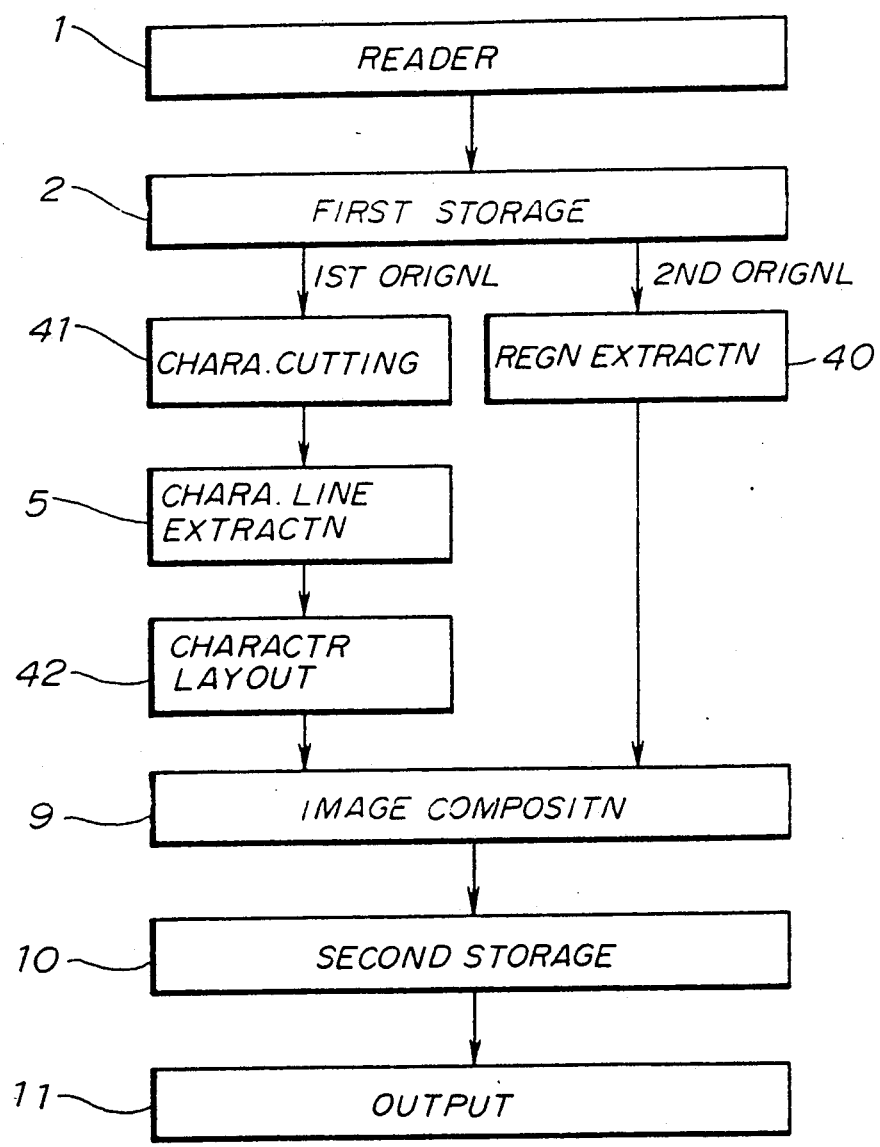
FIG. 36 is a block diagram showing a third embodiment of the digital image forming apparatus according to the present invention.
Figure 37:
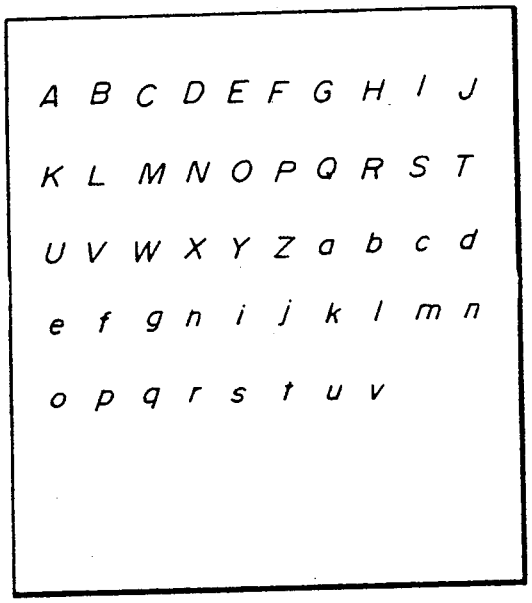
FIG. 37 is a diagram showing a first original having character information before image composition.
Figure 38:
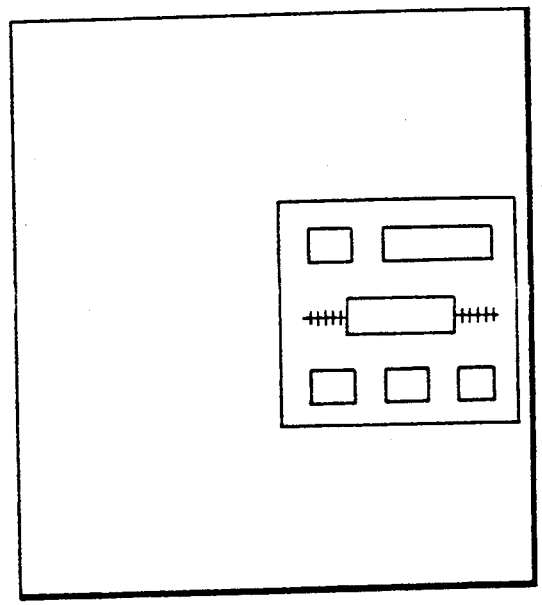
FIG. 38 is a diagram showing a second original having graphic information before image composition.
Figure 39:
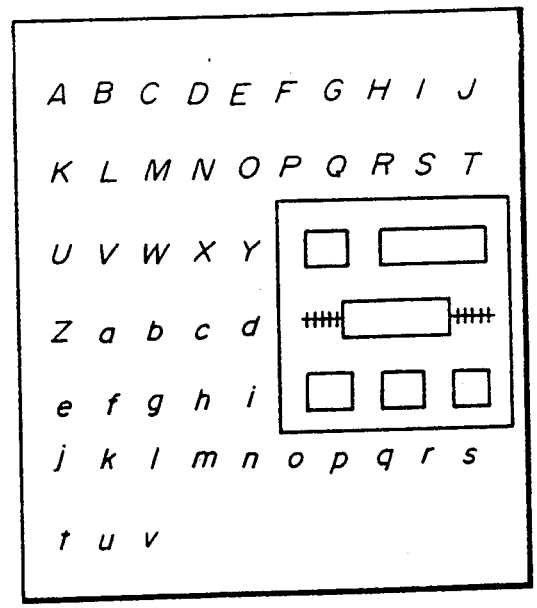
FIG. 39 is a diagram showing a copy in which the image composition of the first and second originals shown in FIGS. 37 and 38 is made.

Next, a description will be given of a third embodiment of a digital image forming apparatus according to the present invention, with reference to FIGS. 36 through 39. In FIG. 36, the digital image forming apparatus is provided with a region extraction part 40, a character cutting part 41 and a character layout part 42 which are not shown in the foregoing embodiments. FIG. 37 shows a first original that has character information before image overlapping, while FIG. 38 shows a second original that has graphic information before image overlapping. FIG. 39 shows a copy in which the image overlapping of the first original having the character information and the second original having the graphic information is made.

The reader 1 optically reads out a first original carrying character information and a second original carrying graphic information, and converts an optical signal into a two-level image data. This two-level image data is stored in the first storage part 2 as the input image data. The first and second originals may be read once per one original, or may be done at a time for the two originals. The character cutting part 41 follows an outline of groups of black pixels interconnected to each other within the input image information for the first original stored in the first storage part 2, to determine the minimum coordinate values of the outline and the length thereof in the main scanning direction and in the sub scanning direction. With these outline data thus determined, the smallest rectangle that surrounds the groups of black pixels is obtained. Groups of black pixels adjacent to each other in which one character image is made up of two or more groups of the black pixels, like in the case of Chinese characters, are taken as one character image. The character line extraction part 5 infers a primary direction of the character line (vertical direction or horizontal direction) from the array of black pixels of the character images and calculates the average character width, the average height and the average distance therebetween so that a character line information defining these data is created.

The region extraction part 40 follows an outline of groups of black pixels within the second original, and determines the minimum coordinate values of the outline and the length thereof in the main scanning direction or in the sub scanning direction. With these outline data thus determined, the region extraction part 40 calculates the smallest rectangle that includes those rectangles surrounding the groups of black pixels, and this graphic information is obtained from the second original. Next, the character layout part 42 extracts overlapping character information from the first original's character line information and from the second original's graphic information thus calculated, the overlapping character information defining character images overlapping the composite image region, and calculates the amount of displacement of each character image which is necessary for the character images to be located outside the composite image region of the first original. This composite image region corresponds with the region of the second original in which the graphic images are located. Based on the displacement calculated by the character layout part 42, the image composition part 9 writes the character information on the second storage part 10, and writes the graphic information within the composite image region, calculated by the region extraction part 40, on the second storage part 10. The character information and the graphic information define the output image information stored in the second storage part 10. Finally, the output part 11 reads out this output image information from the second storage part 10 and reproduces such output image information on a copy. This copy is ejected out of the digital copying machine. In this manner, a composite image having character information and graphic information as shown in FIG. 39 is reproduced on the copy.

The above described digital image forming apparatus employs two separate storage devices that are the first storage part 2 and the second storage part 10, but it is possible to use only a single storage device instead of these storage parts 2 and 10. This will allow the cost of the digital image forming apparatus to be reduced remarkably, because the current storage devices are usually expensive. To do this, the graphic information to be taken out is deleted after the graphic information is read out from the single storage part. Then, the character cutting procedure and the character layout procedure are performed with the single storage part, and, after these procedures are completed, the character images rearranged are outputted. In addition, the composite image region is automatically extracted from the composite original by in the foregoing embodiment, but it is possible to perform the image overlapping procedure more accurate and more speedy by using an appropriate device such as tablet or marker to designate the composite image region previously. And, in this embodiment, it is possible to designate a composite image region for both the first original and the second original, so that an image overlapping is carried out to fit snugly an image in an arbitrary region into another arbitrary region. And, it is possible to easily carry out image overlapping of a multi-level image data with the above described region designation part.

Next, a description will be given of another operation of the digital image forming apparatus shown in FIG. 36, with reference to FIGS. 40 through 46.

FIGS. 40A to 40C and FIGS. 41A to 41C are diagrams for explaining the method of character cutting. Unlike the case of alphabets shown in FIG. 40A, in the case of Chinese characters on an original to be scanned, there are a plurality of outline data extracted in the outline following step within one character image information as shown in FIGS. 40B and 40C. To extract one character image information from the plurality of the outline data, it is necessary to determine a distance between adjacent outlines within the outline image information. When the distance thus determined is smaller than a prescribed threshold value, those outline data are unified into one character information. By repeating this procedure, the character cutting is carried out, as shown in FIGS. 41A through 41C.

Figure 42:
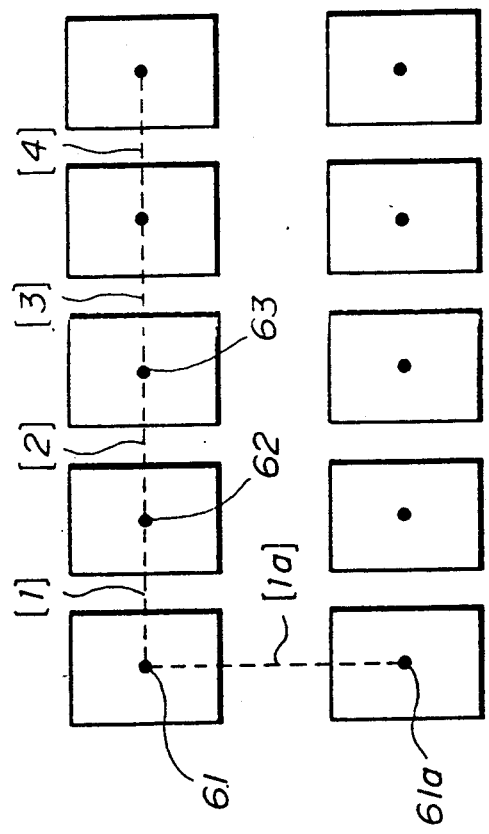
FIGS. 42 and 43 are diagrams for explaining the method of character line extraction.
Figure 43:
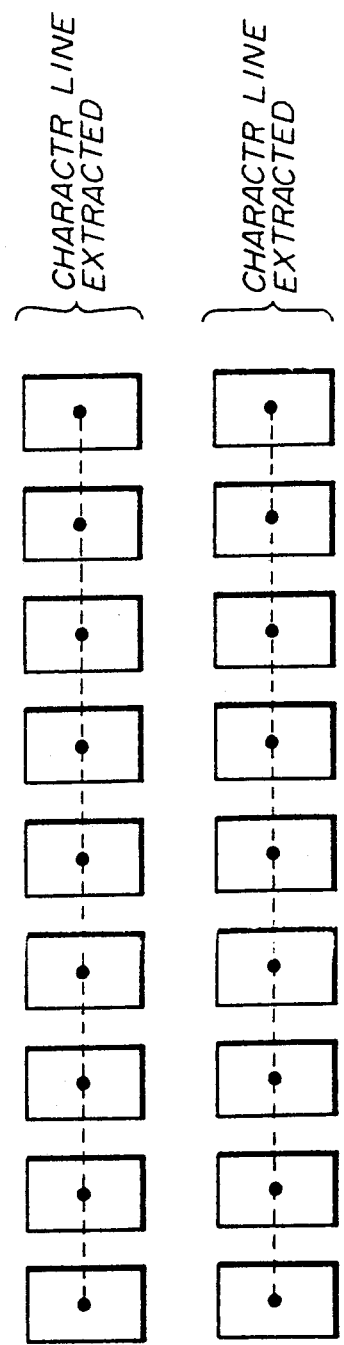
Figure 44B:
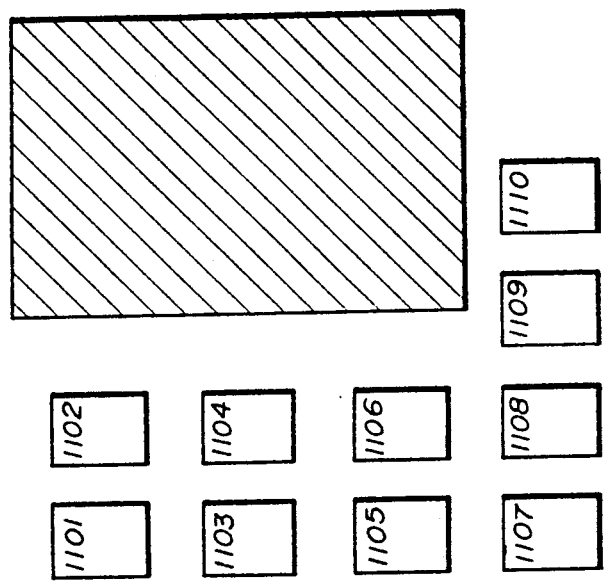
FIGS. 44A and 44B are diagrams for explaining the method of character layout.
Figure 44A:
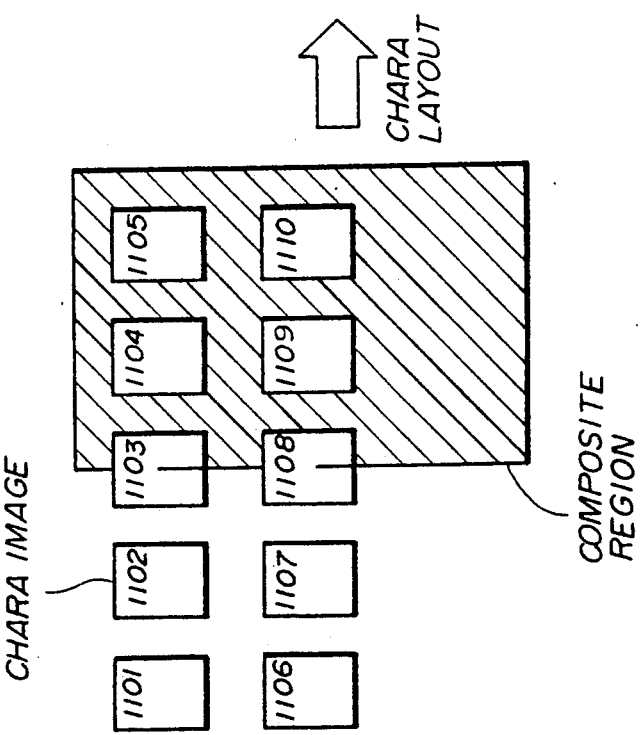

FIGS. 42 and 43 are diagrams for explaining the method of character line extraction. This character line extraction method is the same as that described above with FIGS. 9 and 10, and a description thereof is omitted. FIGS. 44A and 44B are diagrams for explaining the method of character layout. Based on the average height, the average width, the average character pitch and the average line pitch of character images calculated by the character line extraction part 5, each displacement of character images 1103 to 1105 and 1108 to 1110 within a composite region shown in FIG. 44A is calculated for re-arranging these character images, as shown in FIG. 44B. The character layout is carried out by moving the character images 1103 to 1105 and 1108 to 1110 shown in FIG. 44A to those corresponding positions shown in FIG. 44B without changing the sequence of the original character images. In this manner, it is possible to carry out image overlapping of two originals with no loss of characters within the composite region.

Figure 45B:
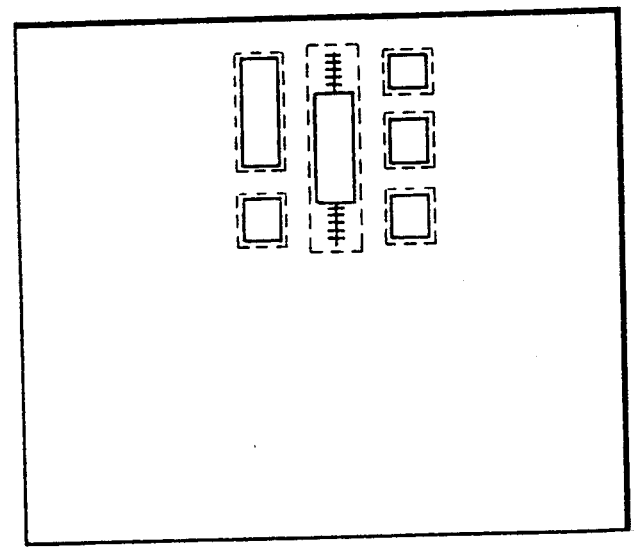
FIGS. 45A and 45B are diagrams for explaining the method of composite region extraction.
Figure 45A:
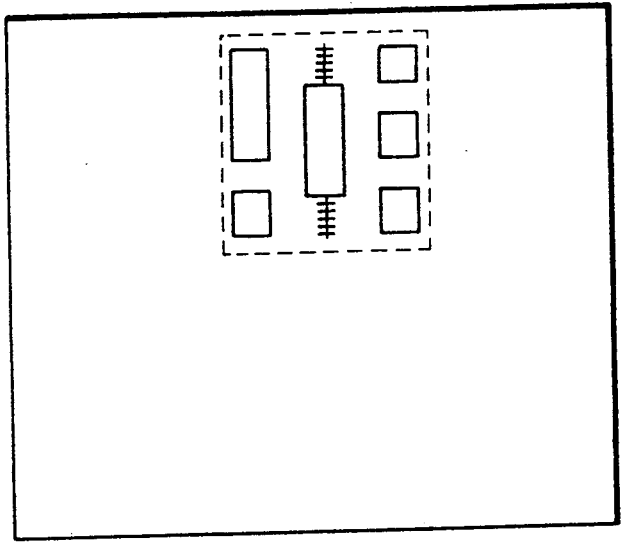

FIGS. 45A and 45B are diagrams for explaining the method of composite region extraction. One method to automatically extract a graphic image region from the second original is described. A first step of this method is to follow an outline of a set of black pixels in the second original to obtain the smallest rectangle that surrounds the set of black pixels, as indicated by a dotted line in FIG. 45A. This is repeated until all the sets of black pixels in the second original are followed. A next step is to determine the smallest rectangle which includes all the rectangles obtained in the first step, and to take the rectangle including all those rectangles as the composite region, as shown in FIG. 45B. There is another method of composite region extraction. In this method, black pixels within the second original are statistically calculated in horizontal and vertical columns, and the smallest rectangle which includes all the portions where the number of black pixels is greater than a predetermined threshold value is obtained as the composite region. When the second original contains a multi-level graphic image information, it is necessary to previously determine a threshold value concerning optical density for discriminating between background optical density and image optical density. The composite region extraction may be carried out by assuming that portions with an optical density greater than such predetermined threshold value are black pixels, and portions with an optical density smaller than such predetermined threshold value are white pixels.

Figures 46A, 46B:
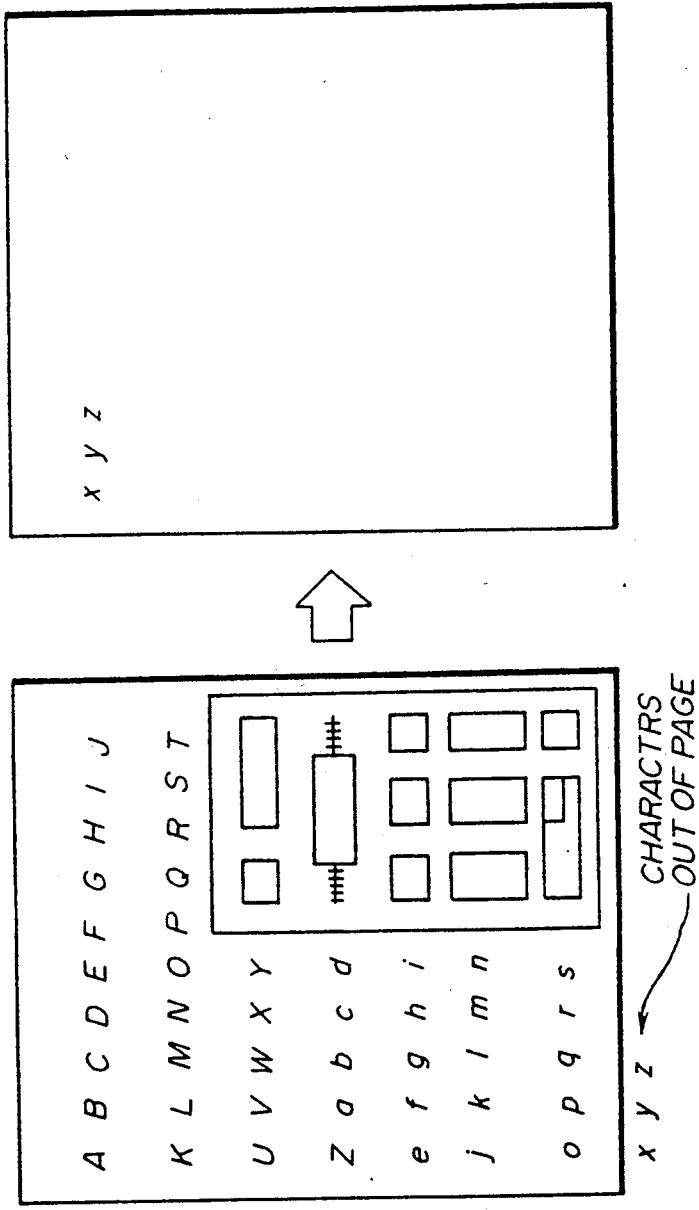
FIGS. 46A and 46B are diagrams for explaining the procedure when a character overflow takes place.

FIGS. 46A and 46B are diagrams for explaining the method of character overflow correction. When a part of the character images after the character layout procedure is carried out goes out of page, as shown in FIG. 46A, it is necessary to place such protruding character images at top of the next page, as shown in FIG. 46B. The position where the protruding character images are placed on the next page is aligned with the starting position of the character line on the preceding page.

Figure 47:
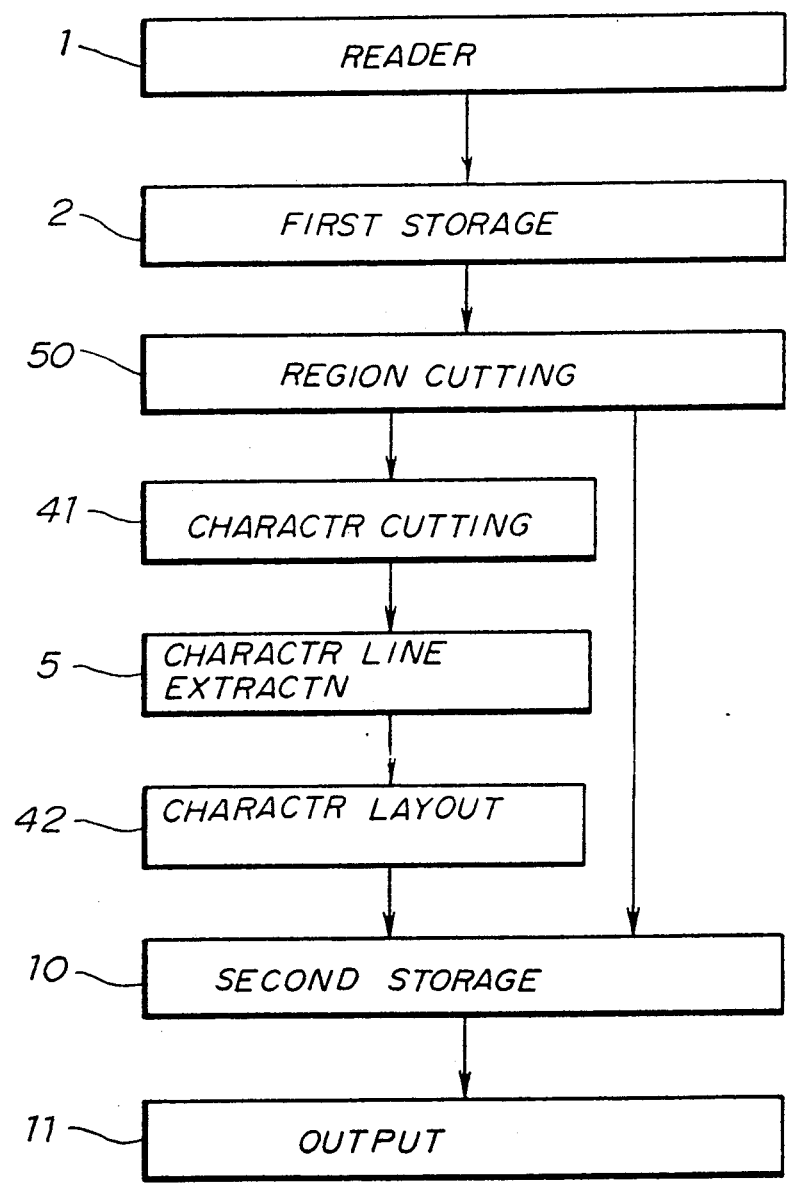
FIG. 47 is a block chart showing a fourth embodiment of the digital image forming apparatus according to the present invention.
Figure 48:
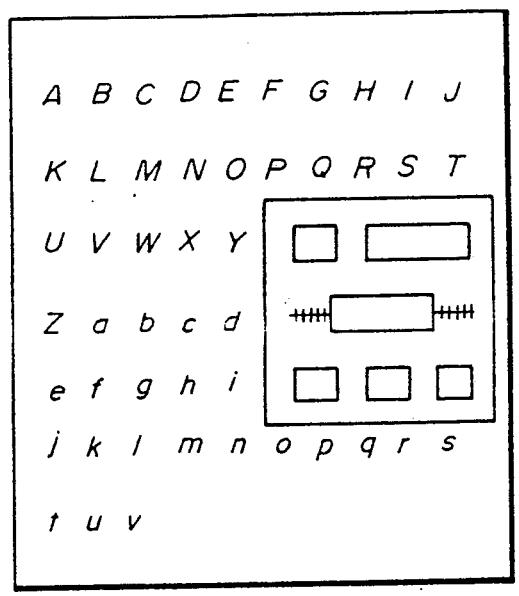
FIG. 48 is a diagram showing an original having character information and graphic information.
Figure 49:
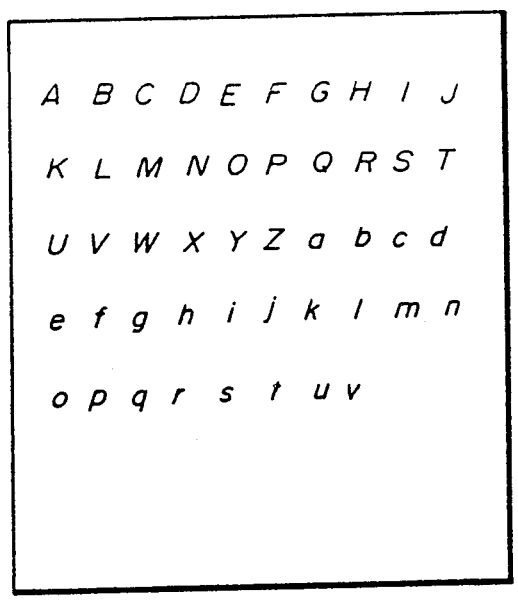
FIG. 49 is a diagram showing a copy in which the character information is reproduced from the original shown in FIG. 48 and rearranged.
Figure 50:
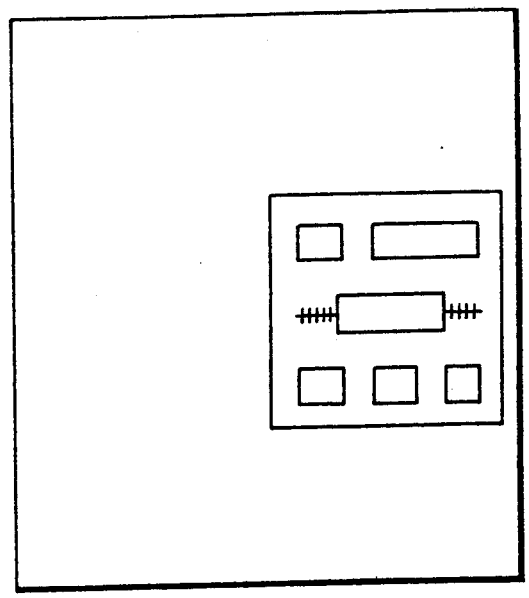
FIG. 50 is a diagram showing a copy in which the graphic information is reproduced from the original shown in FIG. 48 are rearranged.

Next, a description will be given of a fourth embodiment of a digital image forming apparatus according to the present invention, with reference to FIGS. 47 through 53. FIG. 47 is a block chart showing the fourth embodiment of the present invention. In FIG. 47, the digital image forming apparatus is provided with a region cutting part 50 which is not shown in the foregoing embodiments. FIG. 48 is a diagram showing an original to be optically scanned by a reader 1, which contains both character information and graphic information. The reader 1 optically reads this original and converts the optical information into a two-level digital data, so that the two-level digital data is stored in a first storage part 2 as the input image information. The region cutting part 50 follows an outline of groups of black pixels connecting each other within the input image information stored in the first storage part 2, to determine the minimum value of the outline and the length thereof in the main scanning direction or in the sub scanning direction. With these outline minimum value and length, the smallest rectangle that surrounds the groups of black pixels is obtained. The region cutting part 50 discriminates the groups of black pixels between character information and graphic information with the size of the smallest rectangle thus obtained. If the black pixels include a part of the graphic information, the corresponding region of the graphic information is taken out and the graphic information is stored in a second storage part 10 by the region cutting part 50. An output part 11 reproduces the graphic information stored in the second storage part 10 on a copy, and this copy is outputted by the output part 11. The outputted copy has a graphic image as shown in FIG. 50.

A character cutting part 41 cuts out the character information stored in the first storage part 2 in accordance with information concerning the smallest rectangle that surrounds the groups of black pixels. Groups of black pixels adjacent to each other in which one character image is made up of two or more groups of the black pixels, like in the case of Chinese characters, are regarded one set of character images. A character line extraction part 5 infers a primary direction of the character line (vertical direction or horizontal direction) from the distribution of the character images to calculate the average character width, the average character height and the average distances therebetween. The character layout part 42 calculates, based on the data calculated by the character line extraction part 5, the amount of displacement of each of the character images for rearrangement thereof so that the lines of characters are extended to a region from which the graphic information is removed by the region cutting part 50 and are aligned again. And, the character layout part 42 stores the character image data thus calculated in a second storage part 10. Finally, the output part 11 produces an image corresponding to the character image data from the second storage part 10 on a copy, and ejects this copy out of the digital image forming apparatus. The outputted copy has a character image as shown in FIG. 49.

The above described image forming apparatus employs two separate storage devices that are the first storage part 2 and the second storage part 10, but it is possible to use only a single storage device instead of these storage parts 2 and 10. This will allow the cost of the digital image forming apparatus to be reduced remarkably, because storage devices currently are expensive. To do this, the graphic information to be taken out is deleted after the graphic information is read out from the single storage part. Then, the character cutting procedure and the character layout procedure are performed with the single storage part, and, after these procedures are completed, the character images rearranged are outputted. In addition, the composite image region is automatically extracted from the composite original by in the foregoing embodiment, but it is possible to perform the image composition procedure more accurate and more speedy by using an appropriate device such as tablet or marker to previously designate the composite image region.

Next, a description will be given of another operation of the digital image forming apparatus shown in FIG. 47, with reference to FIGS. 51 through 53.

FIG. 51A and 51B show diagrams for explaining the method of character layout. The character images are moved to and rearranged within the region from which the graphic image is removed, using the average character height, the average character width, and the average character pitches calculated by the character line extraction part 5. Amount of displacement of each character image used for character movement have to be calculated for the character layout which should be made. The character layout method is to move character images at positions of rectangles 1101 through 1110 shown in FIG. 51A, which are located out of the graphic image region, to character images at positions of rectangles 1101 through 1110 shown in FIG. 51B. The sequence of the characters must remain unchanged after the character layout is completed. In this manner, it is possible to change the layout of the original from which the graphic image in the designated region is taken out, by rearranging the character images in a region including the vacant area corresponding to the removed graphic image region without changing a structure of a sentence being built by the characters in the original.

FIGS. 52A and 52B are diagrams for explaining the method of automatic region extraction. A conceivable method to automatically extract a graphic image region from an original is to follow an outline of groups of black pixels within the original to determine the minimum rectangle that surrounds each group of black pixels, as indicated by dotted lines in FIG. 52A, and extract the smallest rectangle that surrounds all the rectangles for the groups of black pixels, as indicated by dotted lines in FIG. 52A, through the character/graphic discrimination procedure described above, and the extracted rectangle is defined as a graphic image region as shown in FIG. 52B.

Figure 53A:
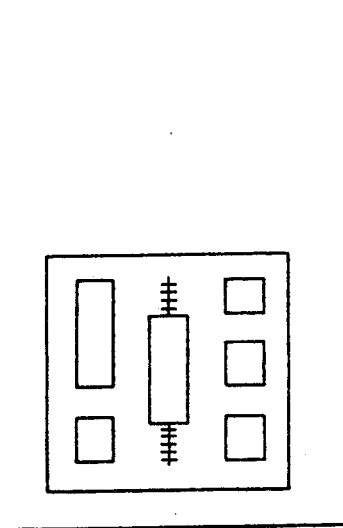
FIGS. 53A and 53B are diagrams for explaining the output procedure.
Figure 53B:
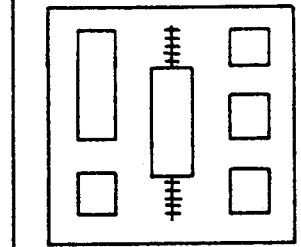

FIGS. 53A and 53B are diagrams for explaining the outputting procedure of the digital image forming apparatus. It is possible to produce a copy in which a character image after the character layout procedure formed on a first output copy and a graphic image after the region cutting procedure formed on a second output copy, as shown in FIG. 53A, are re-arranged within a single output copy as shown in FIG. 53B. This is achieved by the image composition function of the digital image forming apparatus. Therefore, it is possible to reduce the total number of copies required.

Further, the present invention is not limited to these embodiments, and variations and modifications may be made without departing from the scope of the present invention.

What is claimed is:

1. A digital image forming apparatus, comprising:

a) image reading means for optically scanning an original including character information and graphic information thereon to generate an input image signal, and photoelectrically converting the input image signal into two-level image information including character images and graphic images;

b) first storage means for storing the two-level image formation from the image reading means;

c) second storage means for storing output image information;

d) character extraction means for individually extracting the character images from said two-level image information to define character line information within the output image information, the character line information including a size of each of the character images, an array of black pixels within the character images, a set of lines of characters and a primary alignment direction;

e) character alignment means for correcting the character images to have the same size and the same distance therebetween, and aligning the set of lines of characters in the primary alignment direction in accordance with the character line information to define output character image information stored in the second storage means; and f) output means for outputting a copy in which the output image information stored in the second storage means is reproduced;

wherein said character alignment means calculates information with respect to enlargement, reduction and movement of the character information within the original, so that the output character image information has the calculated information with respect to the enlargement, the reduction and the movement and said output character image information is defined in the output image information; and wherein said information calculated by said character alignment means includes the average height of the character images, the average width thereof and the average distance therebetween, said digital image forming apparatus performing the enlargement, the reduction and the movement of the two-level image information based on said calculated information, so that the extracted character information in the output image information includes character images with the same size and the same distance therebetween and the set of lines of characters each aligned in the primary alignment direction.

2. A digital image forming apparatus as claimed in claim 1, wherein the character extraction means defines the primary alignment direction from the two-level image information, said primary alignment direction being parallel to either a main scanning direction along which the original is optically scanned by the image reading means, or a sub scanning direction perpendicular to the main scanning direction.

3. A digital image forming apparatus as claimed in claim 2, wherein said image forming apparatus further comprises discrimination means for discriminating between the character images and the graphic images from the two-level image information from the image reading means, and image composition means for supplying a composite image information by image composition of the character images and the graphic images, the graphic images discriminated by the discrimination means being overlapped over the character images by the output character image information in a composite image region to form a composite image on the outputted copy in the composite image region, the composite image information being defined within the output image information.

4. A digital image forming apparatus, comprising:

a) image reading means for optically reading an original carrying character information and graphic information to generate an input image signal, and photoelectrically converting the input image signal into two-level image information carrying character images and graphic images;

b) first storage means for storing the two-level image information from the image reading means;

c) second storage means for storing output image information;

d) character extraction means for individually extracting the character images from said two-level image information to define character line information within the output image information, the character line information including a size of each of the character images, an array of black pixels within the character images, a set of lines of characters and a primary alignment direction;

e) character alignment means for correcting the character images to have the same size and the same distance therebetween, and aligning the set of lines of characters along the primary alignment direction in accordance with the character line information to define output character image information stored in the second storage means; and f) output means for outputting a copy in which the output image information stored in the second storage means is reproduced;

g) discrimination means for discriminating between the character images and the graphic images from the two-level image information from the image reading means;

h) image composition means for supplying a composite image information by image composition of the character images and the graphic images, the graphic images discriminated by the discrimination means being overlapped over the character images by the output character image information in a composite image region f to form a composite image on the output copy in the composite image region, the composite image information being defined within the output image information;

i) vectorization means for linear approximation of the graphic images to define vectors with approximated linear graphic information; and j) vector correction means for correcting the vectors to supply corrected graphic information to the image composition means;

wherein said character alignment means calculates information with respect to enlargement, reduction and movement of the character information within the original, so that the output character image information has the calculated information with respect to the enlargement, the reduction and the movement and said output character image information is defined in the output image information; and wherein the character extraction means defines the primary alignment direction from the two-level image information, said primary alignment direction being parallel to either a main scanning direction along which the original is optically scanned by the image reading means, or a subscanning direction perpendicular to the main scanning direction.

5. A digital image forming apparatus, comprising:
   a) image reading means for optically reading an original carrying character information and graphic information to generate an input image signal, and photoelectrically converting the input image signal into two-level image information carrying character images and graphic images;
   b) first storage means for storing the two-level image information from the image reading means;
   c) second storage means for storing output image information;
   d) character extraction means for individually extracting the character images from said two-level image information to define character line information within the output image information, the character line information including a size of each of the character images, an array of black pixels within the character images, a set of lines of characters and a primary alignment direction;
   e) character alignment means for correcting the character images to have the same size and the same distance therebetween, and aligning the set of lines of characters along the primary alignment direction in accordance with the character line information to define output character image information stored in the second storage means; and
   f) output means for outputting a copy in which the output image information stored in the second storage means is reproduced;
   g) character direction conversion means for converting a first character direction of each of the character images to which a top of each of the character images faces, into a second character direction,
      1) said character images aligned in the first character direction being rotated by ninety degrees counterclockwise by the character direction conversion means when the first character direction is substantially parallel to the subscanning direction, and
      2) said character images being rotated by ninety degrees clockwise by the character direction conversion means when the first character direction is substantially parallel to the main scanning direction;
   wherein said character alignment means calculates information with respect to enlargement, reduction and movement of the character information within the original, so that the output character image information has the calculated information with respect to the enlargement, the reduction and the movement and said output character image information is defined in the output image information; and
   wherein the character extraction means defines the primary alignment direction from the two-level image information, said primary alignment direction being parallel to either a main scanning direction along which the original is optically scanned by the image reading means, or a subscanning direction perpendicular to the main scanning direction.

6. A digital image forming apparatus as claimed in claim 1, wherein the digital image forming apparatus further comprises region designation means for designating a specific region within the original carrying the character information and the graphic information, said specific region carrying a first information and being designated by a suitable region designation device to define the second information within the second storage means.

7. A digital image forming apparatus as claimed in claim 6, wherein the digital image forming apparatus further comprises region extraction means for extracting from the two-level image information a second information in a remaining region of the original outside the designated region, said second information being defined by removing the first information in the designated region from the two-level image information, and said second information being defined within the output image information stored in the second storage means.

8. A digital image forming apparatus, comprising:
   a) image reading means for optically scanning a first original carrying character information and a second original carrying graphic information, and for photoelectrically converting an input image signal into two-level image information carrying character images from the first original and graphic images from the second original;
   b) first storage means for storing the two-level image information from the image reading means;
   c) second storage means for storing output image information;
   d) character cutting means for individually extracting the character images from the two-level image information to define extracted character information within the output image information, the extracted character information including a size of each of the character images and an array of black pixels within the character images;
   e) character line extraction means for extracting character line information from said two-level image information based on the size of each of said character images and the array of black pixels within said character images, said character line information defining a set of lines of characters and a primary alignment direction within the output image information;
   f) character layout means for re-arranging the character images so that a part of the character images overlapping a composite image region of the first original is placed in a remaining region of the first original outside the composite image region, the composite image region corresponding to a region of the second original in which the graphic information is located, said character layout means defining composite image information including the re-arranged character images from the first original and the graphic images from the second original within the output image information stored in the second storage means;
   g) output means for outputting a copy in which the output image information stored in the second storage means is reproduced; and
   h) region extraction means for extracting the graphic images within the composite image region from the two-level image information, and writing said graphic images on the second storage means, the region extraction means defining region information within the output image information, the region information including said graphic images within said composite region of the second original;

wherein said character layout means modifies the character line information to re-arrange the character images when the quantity of the character images overflow outside a range of a single page, so that said character images are arranged starting from a top of a page following the single page.

9. A digital image forming apparatus comprising:
a) image reading means for optically scanning a first original including character information and a second original including graphic information, and for photoelectrically converting an input image signal into two-level image information including character images from the first original and graphic images from the second original;
b) first storage means for storing the two-level image information from the image reading means;
c) second storage means for storing output image information;
d) character cutting means for individually extracting the character images from the two-level image information to define extracted character information within the output image information, the extracted character information including a size of each of the character images and an array of black pixels within the character images;
e) character line extraction means for extracting character line information from said two-level image information based on the size of each of said character images and the array of black pixels within said character images, said character line information defining a set of lines of characters and a primary alignment direction within the output image information;
f) character layout means for re-arranging the character images so that a part of the character images overlapping a composite image region of the first original is placed in a remaining region of the first original outside the composite image region, the composite image region corresponding to a region of the second original in which the graphic information is located, said character layout means defining composite image information including the re-arranged character images from the first original and the graphic images from the second original within the output image information stored in the second storage means;
g) output means for outputting a copy in which the output image information stored in the second storage means is reproduced; and
h) region extraction means for extracting the graphic images within the composite image region of the second original from the two-level image information, and recording said graphic images on the second storage means, the region extraction means defining region information within the output image information, the region information including said graphic images within said composite region;
wherein said character layout means calculates information with respect to movement of the character information within the first original so that the output character image information has the calculated information with respect to the movement and said output character image information is defined in the output image information; and
wherein said information calculated by said character layout means includes the average height of the character images, the average width thereof and the average distance therebetween, said digital image forming apparatus performing the movement of the two-level image information based on said calculated information, so that the extracted character information in the output image information includes character images with the same size and the same distance therebetween and the set of lines of characters each aligned in the primary alignment direction.

10. A digital image forming apparatus comprising:
a) image reading means for optically scanning a first original including character information and a second original including graphic information, and for photoelectrically converting an input image signal into two-level image information including character images from the first original and graphic images from the second original;
b) first storage means for storing the two-level image information from the image reading means;
c) second storage means for storing output image information;
d) character cutting means for individually extracting the character images from the two-level image information to define extracted character information within the output image information, the extracted character information including a size of each of the character images and an array of black pixels within the character images;
e) character line extraction means for extracting character line information from said two-level image information based on the size of each of said character images and the array of black pixels within said character images, said character line information defining a set of lines of characters and a primary alignment direction within the output image information;
f) character layout means for re-arranging the character images so that a part of the character images overlapping a composite image region of the first original is placed in a remaining region of the first original outside the composite image region, the composite image region corresponding to a region of the second original in which the graphic information is located, said character layout means defining composite image information including the re-arranged character images from the first original and the graphic images from the second original within the output image information stored in the second storage means;
g) output means for outputting a copy in which the output image information is stored in the second storage means is reproduced; and
h) region extraction means for extracting the graphic images within the composite image region of the second original from the two-level image information, and recording said graphic images on the second storage means, the region extraction means defining region information within the output image information, the region information including said graphic images within said composite image region;
wherein said character layout means modifies the character line information to re-arrange the character images when the quantity of the character information exceeds the quantity of information contained in a single page, so that the rest of the character information overflowing from a range of the single page is arranged starting from a top of a next page following the single page;

wherein said character layout means calculates information with respect to movement of the character information within the first original so that the output character image information has the calculated information with respect to the movement and said output character image information is defined in the output image information; and wherein said information calculated by said character layout means includes the average height of the character images, the average width thereof and the average distance therebetween, said digital image forming apparatus performing the movement of the two-level image information based on said calculated information, so that the extracted character information in the output image information includes character images with the same size and the same distance therebetween and the set of lines of characters each aligned in the primary alignment direction.

* * * * *